US009650755B2

(12) United States Patent
Nomura et al.

(10) Patent No.: US 9,650,755 B2
(45) Date of Patent: May 16, 2017

(54) DISPLAY SYSTEM OF EXCAVATING MACHINE, EXCAVATING MACHINE, AND DISPLAY COMPUTER PROGRAM OF EXCAVATING MACHINE

(71) Applicant: Komatsu Ltd., Tokyo (JP)

(72) Inventors: Azumi Nomura, Fujisawa (JP); Takashi Kurihara, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/233,947

(22) PCT Filed: Jul. 23, 2013

(86) PCT No.: PCT/JP2013/069946
§ 371 (c)(1),
(2) Date: Jan. 21, 2014

(87) PCT Pub. No.: WO2014/054327
PCT Pub. Date: Apr. 10, 2014

(65) Prior Publication Data
US 2015/0345114 A1    Dec. 3, 2015

(30) Foreign Application Priority Data

Oct. 5, 2012    (JP) ................................ 2012-223673

(51) Int. Cl.
*E02F 9/26*    (2006.01)
*E02F 5/02*    (2006.01)
(Continued)

(52) U.S. Cl.
CPC ............ *E02F 3/3677* (2013.01); *E02F 3/435* (2013.01); *E02F 5/025* (2013.01); *E02F 9/261* (2013.01);
(Continued)

(58) Field of Classification Search
CPC . E02F 3/3677; E02F 3/141; E02F 3/28; E02F 3/025; E02F 3/303; E02F 3/307;
(Continued)

(56) References Cited

U.S. PATENT DOCUMENTS 4,364,439 A * 12/1982 Asai ...................... E02F 3/7613
                                                                172/821
5,713,144 A *  2/1998 Haraoka ................... E02F 9/26
                                                                172/4.5
(Continued)

FOREIGN PATENT DOCUMENTS

CN        1210570 A    3/1999
CN      202347549 U    7/2012
(Continued)

OTHER PUBLICATIONS

International Search Report dated Oct. 29, 2013, mailed for PCT/JP2013/069946.

*Primary Examiner* — Thomas G Black
*Assistant Examiner* — Sara Lewandroski
(74) *Attorney, Agent, or Firm* — Locke Lord LLP

(57) ABSTRACT

A display system of excavating machine includes a vehicle state detection unit configured to detect information related to a current position and a posture of the excavator as an excavating machine; a storage unit configured to store at least position information of a target surface indicating a target shape of an object to be worked; a bucket tilt detection unit configured to detect a tilt angle of the bucket; and a processing unit configured to obtain an angle between the edge and the target surface from a position of the edge of the bucket obtained based on the tilt angle of the bucket and the information related to a current position and a posture of the excavator and to display posture information indicating
(Continued)

information related to a posture of the bucket on a screen of a display unit based on the obtained edge tilt angle.

7 Claims, 12 Drawing Sheets

(51) Int. Cl.
    *E02F 3/36*     (2006.01)
    *E02F 3/43*     (2006.01)
    *G01S 19/43*     (2010.01)
    *G01S 19/48*     (2010.01)

(52) U.S. Cl.
    CPC .............. *E02F 9/264* (2013.01); *G01S 19/43* (2013.01); *G01S 19/48* (2013.01)

(58) Field of Classification Search
    CPC . E02F 9/264; E02F 9/261; E02F 9/265; E02F 9/26; E02F 9/2045; E02F 5/025
    USPC .......................................................... 701/50
    See application file for complete search history.

(56) References Cited

U.S. PATENT DOCUMENTS

| | | | |
|---|---|---|---|
| 6,532,409 B1 * | 3/2003 | Fujishima | E02F 3/437 340/500 |
| 6,766,600 B2 | 7/2004 | Ogura et al. | |
| 7,513,070 B2 | 4/2009 | Ogura et al. | |
| 7,756,638 B2 | 7/2010 | Hoashi | |
| 8,463,512 B2 * | 6/2013 | Hayashi | E02F 3/847 172/2 |
| 2003/0001750 A1 * | 1/2003 | Ishimoto | B66C 13/18 340/691.6 |
| 2006/0026101 A1 | 2/2006 | Ogura et al. | |

FOREIGN PATENT DOCUMENTS

| | | |
|---|---|---|
| JP | 06-322789 A | 11/1994 |
| JP | 2002-340556 A | 11/2002 |
| JP | 2005-011058 A | 1/2005 |
| JP | 2008-070176 A | 3/2008 |
| JP | 2012-172431 A | 9/2012 |
| JP | 2012172431 A * | 9/2012 |
| WO | WO-02/40783 A1 | 5/2002 |

* cited by examiner

DISPLAY SYSTEM OF EXCAVATING MACHINE, EXCAVATING MACHINE, AND DISPLAY COMPUTER PROGRAM OF EXCAVATING MACHINE

FIELD

The present invention relates to a display system of excavating machine, an excavating machine including the same, and a display computer program of excavating machine used in a display system of excavating machine.

BACKGROUND

Typically, in an excavator, an operator operates an operating lever, so that a work machine including a bucket is driven. At this time, when excavating a slope having a predetermined inclination or a groove having a predetermined depth, it is difficult for the operator to judge whether accurately excavating the slope or the groove according to a targeted shape only by visually recognizing the movement of the work machine. Also, the operator is required to have a high degree of skill to efficiently and accurately excavate the slope having a predetermined inclination, according to the targeted shape. Therefore, for example, there is a technology of displaying position information of the bucket positioned at a tip of the work machine in a display device and supporting the operator (for example, Patent Literature 1).

CITATION LIST

Patent Literature

Patent Literature 1: WO 2002/040783 A

SUMMARY

Technical Problem

By the way, as the bucket attached to the work machine of the excavator, a bucket swingable in a front-back direction or in an up-down direction of the excavator (see the arrow SW illustrated in FIG. 1) is known. Such a bucket revolves around a bucket axis (an axis at a position where an arm and the bucket are coupled) in a parallel position relationship with an axis around which the arm and a boom of the work machine revolve. Further, there is a so-called tilt bucket that revolves around an axis perpendicular to the bucket axis around which the bucket revolves. That is, the tilt bucket is a bucket capable of performing excavation work in a state of swinging the bucket in a right and left direction of the excavator (see the arrow TIL illustrated in FIG. 1) and tilting the bucket into either right or left. The technology disclosed in Patent Literature 1 displays a symbol of a bucket that revolves according to an angle of a back surface of the bucket with respect to a horizontal plane calculated by a control unit. However, the technology disclosed in Patent Literature 1 is intended for a bucket capable of revolving only around a bucket axis in a parallel, position relationship with an axis around which an arm and a boom of a work machine revolve, and there is no description nor suggestion about a tilt bucket.

An objective of the present invention is to provide an operator of an excavating machine including a tilt bucket with information for supporting an operation.

Solution to Problem

According to the present invention, a display system of excavating machine used in an excavating machine including a work machine including a bucket configured to revolve around a first axis and to revolve around a second axis perpendicular to the first axis, so that an edge tilts with respect to a third axis perpendicular to the first axis and to the second axis, and a body unit to which the work machine is attached, the display system of excavating machine comprises a vehicle state detection unit configured to detect information related to a current position and a posture of the excavating machine; a bucket tilt detection unit configured to detect a tilt angle of the bucket; a storage unit configured to store at least position information of a target surface indicating a target shape of an object to be worked; and a processing unit configured to obtain an angle between the edge and the target surface as an edge tilt angle from a position of the edge of the bucket obtained based on the tilt angle of the bucket and the information related to the current position and the posture of the excavating machine, and to display posture information indicating information related to a posture of the bucket on a screen of a display device based on the obtained edge tilt angle.

In the present invention, it is preferable that the processing unit is configured to obtain an angle between a line of intersection in which a plane perpendicular to the second axis and passing through the edge of the bucket intersects with the target surface, and the edge as the edge tilt angle.

In the present invention, it is preferable that the processing unit is configured to make a form of the posture information to be displayed on the screen of the display device different before and after the edge of the bucket faces the target surface.

In the present invention, it is preferable that the processing unit is configured to display the posture information on an end portion of the screen of the display device.

In the present invention, it is preferable that the processing unit is configured to display the posture information on the screen of the display device when the excavating machine constructs a slope.

According to the present invention, an excavating machine comprises: a work machine including a bucket configured to revolve around a first axis and to revolve around a second axis perpendicular to the first axis, so that an edge tilts with respect to a third axis perpendicular to the first axis and to the second axis; a body unit to which the work machine is attached; a traveling device included in the body unit; and the display system of excavating machine.

According to the present invention, a display computer program of excavating machine used for an excavating machine including a work machine including a bucket configured to revolve around a first axis and to revolve around a second axis perpendicular to the first axis, so that an edge tilts with respect to a third axis perpendicular to the first axis and to the second axis, and a body unit to which the work machine is attached, the display computer program comprises: a procedure of obtaining a position of the edge of the bucket based on a tilt angle of the bucket and information related to a current position and a posture of the excavating machine; a procedure of obtaining an angle between a line of intersection in which a plane perpendicular to the second axis and passing through the edge of the bucket intersects with the target surface, and the edge, from the position of the edge as an edge tilt angle; and a procedure of displaying posture information indicating information related to a posture of the bucket on a screen of a display device based on the obtained edge tilt angle.

The present invention can provide an operator of an excavating machine including a tilt bucket with information for supporting an operation.

DESCRIPTION OF EMBODIMENTS

An embodiment for implementing the present invention (embodiment) will be described in detail with reference to the drawings. The present invention is not limited by the content described in the embodiment below. Further, in the embodiments below, an excavator will be described as an example of an excavating machine. However, the excavating machine is not limited to the excavator as long as one has a function to excavate or fill in an object.

<An Overall Configuration of an Excavating Machine>

Figure 1:
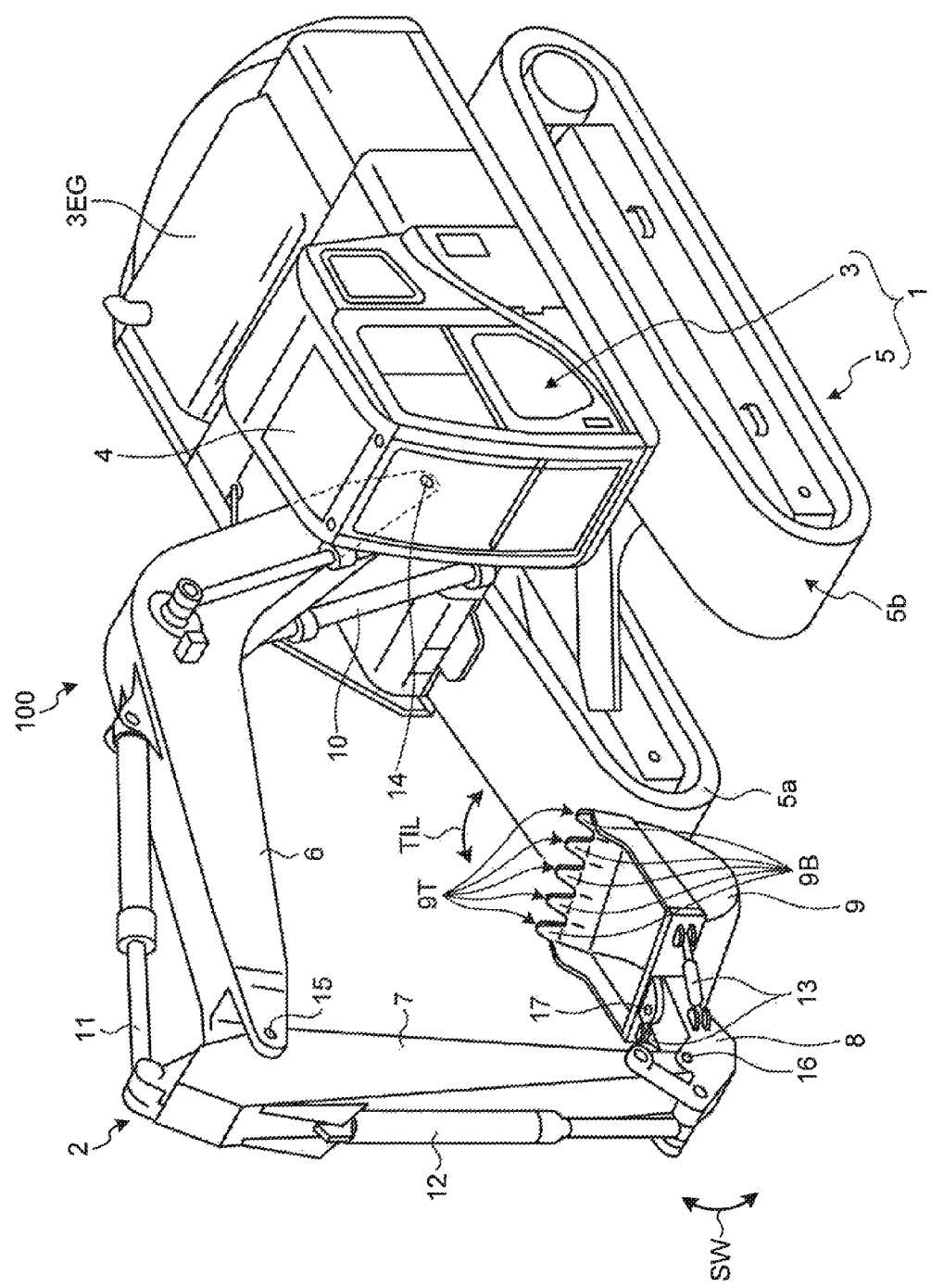
FIG. 1 is a perspective view of an excavator 100 according to a present embodiment.
Figure 2:
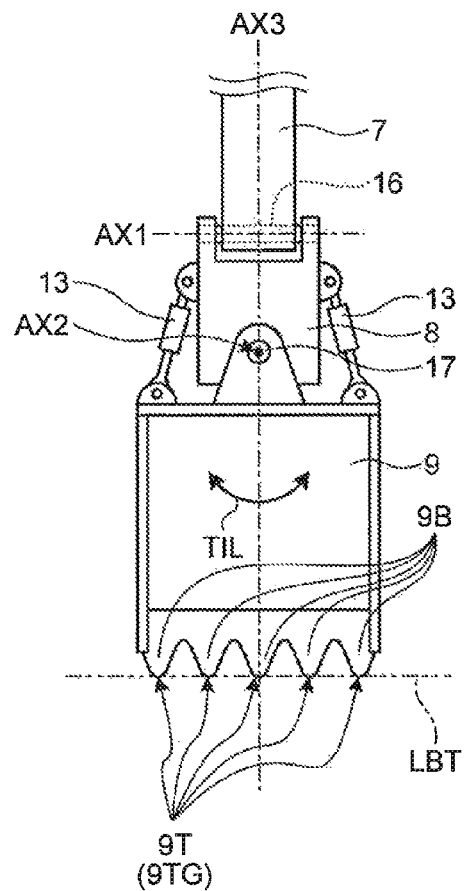
FIG. 2 is a front view of a bucket 9 included in the excavator 100 according to the present embodiment.
Figure 3:
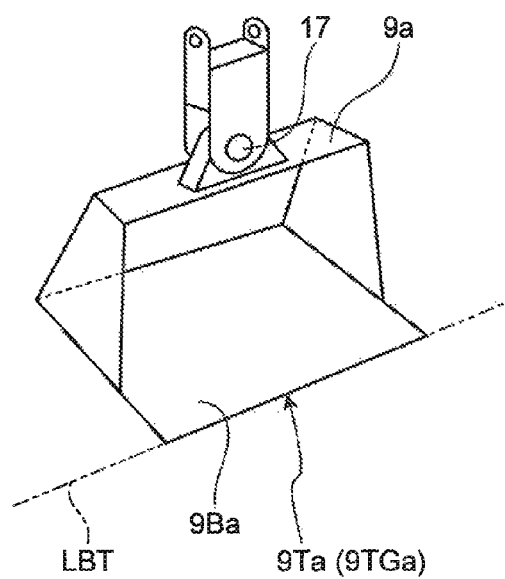
FIG. 3 is a perspective view of a bucket 9a according to another example included in the excavator 100 of the present embodiment.
Figure 4:
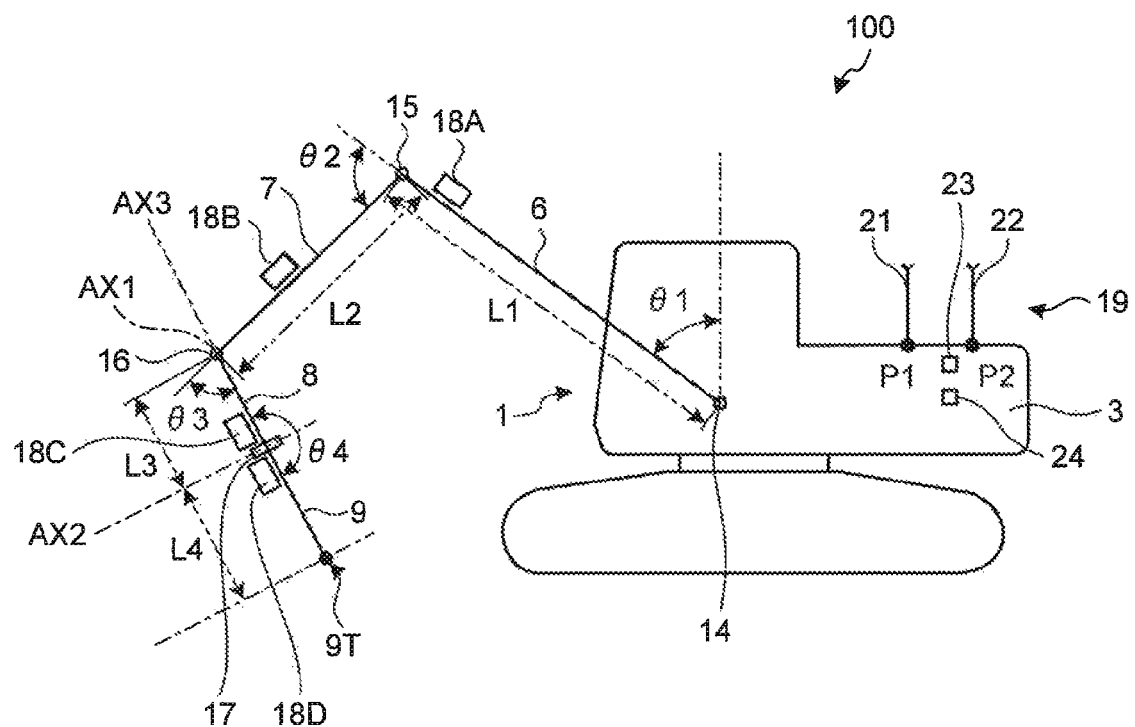
FIG. 4 is a side view of the excavator 100.
Figure 5:
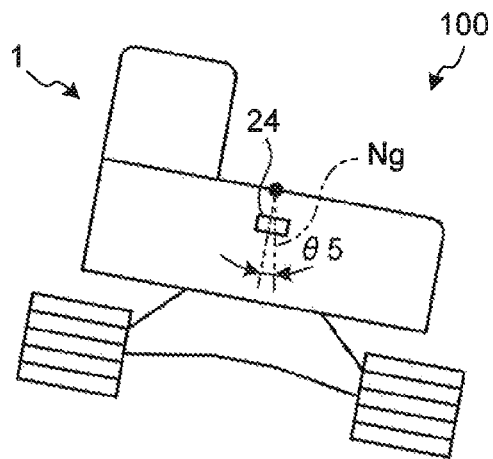
FIG. 5 is a rear view of the excavator 100.
Figure 6:
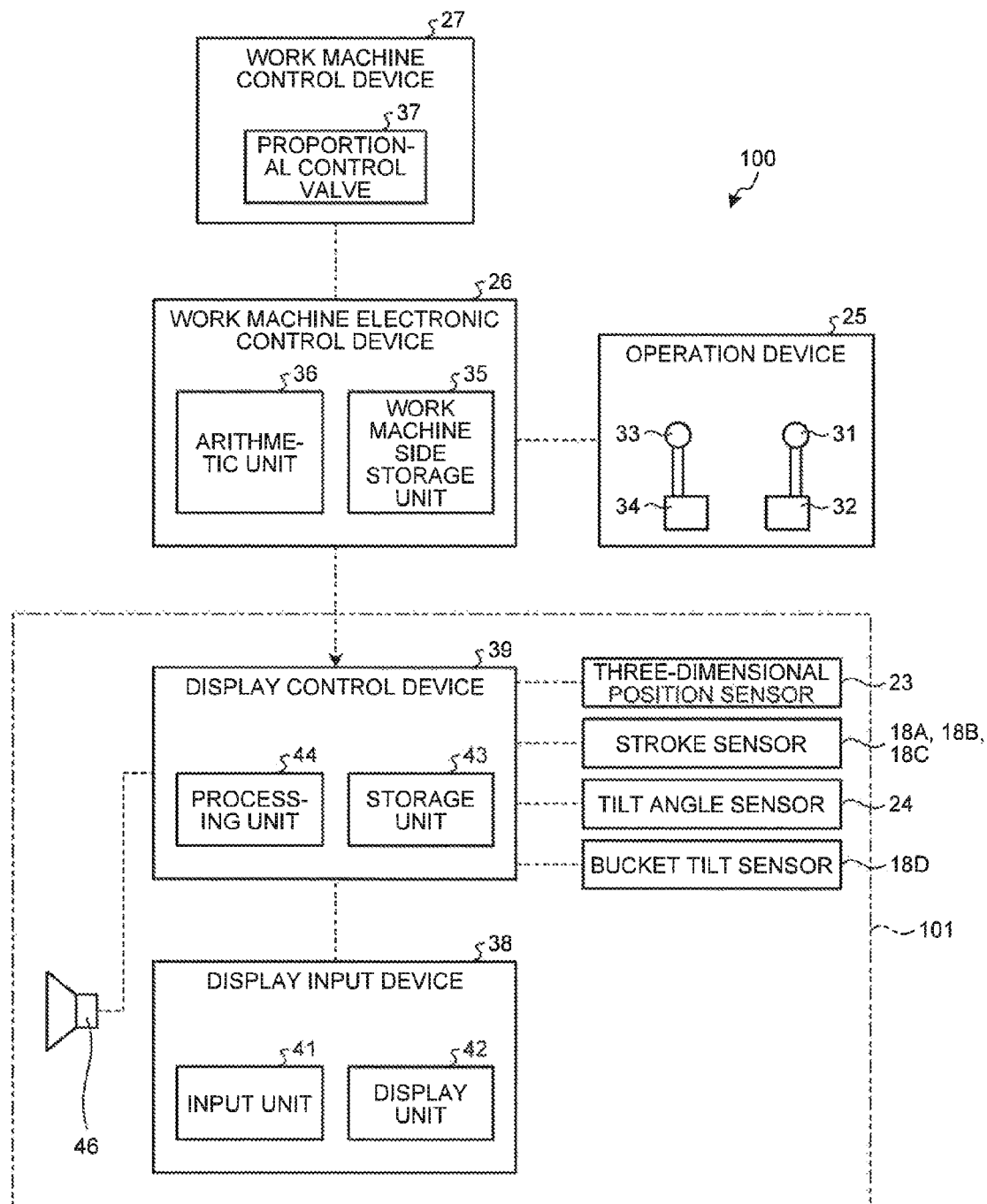
FIG. 6 is a block diagram illustrating a control system included in the excavator 100.
Figure 7:
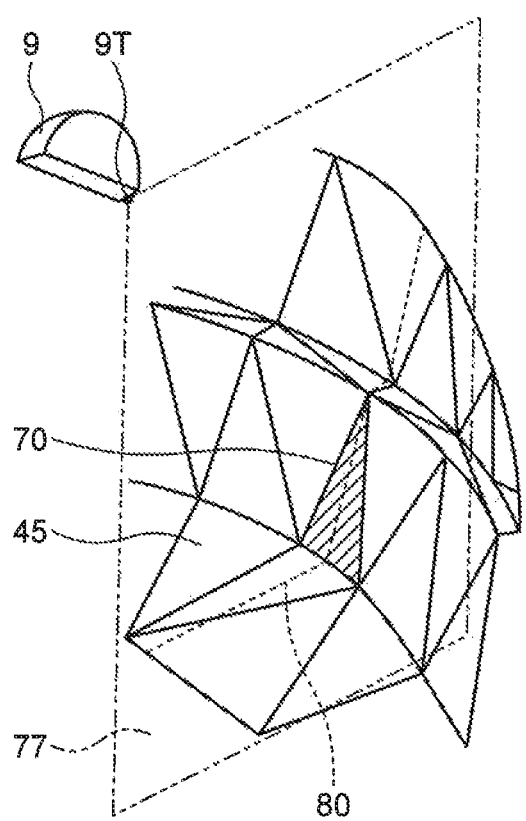
FIG. 7 is a diagram illustrating design topography indicated by design topographic data.

FIG. 1 is a perspective view of an excavator 100 according to the present embodiment. FIG. 2 is a front view of a bucket 9 included in the excavator 100 according to the present embodiment. FIG. 3 is a perspective view of a bucket 9a regarding another example included in the excavator 100 according to the present embodiment. FIG. 4 is a side vide of the excavator 100. FIG. 5 is a rear view of the excavator 100. FIG. 6 is a block diagram illustrating a control system included in the excavator 100. FIG. 7 is a diagram illustrating design topography indicated by design topographic data.

In the present embodiment, the excavator 100 as an excavating machine includes a vehicle body 1 as a body unit and a work machine 2. The vehicle body 1 includes an upper swing body 3 and a traveling device 5. The upper swing body 3 accommodates devices such as a power generation device and a hydraulic pump (not illustrated) inside an engine room 3EG. The engine room 3EG is arranged on one end side of the upper swing body 3.

The excavator 100 in the present embodiment has an internal-combustion engine such as a diesel engine as the power generation device. However, the excavator 100 is not limited to this example. The excavator 100 may include a so-called hybrid-system power generation device, which is a combination of an internal-combustion engine, a generator motor, and an electric storage device.

The upper swing body 3 includes an operator cab 4. The operator cab 4 is placed on the other end side of the upper swing body 3. That is, the operator cab 4 is arranged at a side opposite to the engine room 3EG. In the operator cab 4, a display input device 38 and an operation device 25 illustrated in FIG. 6 are arranged. These devices will be described below. The traveling device 5 mounts the upper swing body 3. The traveling device 5 includes caterpillar bands 5a and 5b. The traveling device 5 travels by driving of a hydraulic motor (not illustrated) and rotation of the caterpillar bands 5a and 5b, thereby to cause the excavator 100 to travel. The work machine 2 is attached to the upper swing body 3 at the side of the operator cab 4.

Note that the excavator 100 may include tires in place of the caterpillar bands 5a and 5b, and include a traveling device capable of driving by transmitting driving force of a diesel engine (not illustrated) to the tires through a transmission. For example, as the excavator 100 having such a form, a wheel-type excavator may be employed. Alternatively, the excavator 100 may be, for example, a backhoe loader that includes such a traveling device having tires, a work machine attached to a vehicle body (body unit), and a structure not provided with an upper swing body and a swing mechanism like FIG. 1. That is, the backhoe loader has the work machine attached to the vehicle body and a traveling device that constitutes a part of the vehicle body. By attaching a tilt bucket to a bucket of the work machine of the backhoe loader, work such as excavating a slope becomes possible.

In the upper swing body 3, the side where the work machine 2 and the operator cab 4 are arranged is a front side, and the side where the engine room 3EG is arranged is a rear side. Facing front, the left side is a left side of the upper swing body 3, and the right side is a right side of the upper swing body 3. Also, in the excavator 100 or the vehicle body 1, the side of the traveling device 5 based on the upper swing body 3 is a lower side, and the side of the upper swing body 3 based on the traveling device 5 is an upper side. In a case where the excavator 100 is installed on a horizontal plane, the lower side is in the vertical direction, that is, in the direction of action of gravity, and the upper side is in a direction opposite to the vertical direction.

The work machine 2 includes a boom 6, an arm 7, a bucket 9, a boom cylinder 10, an arm cylinder 11, a bucket cylinder 12, and a tilt cylinder 13. Note that the arrow SW and the arrows TIL illustrated in FIGS. 1 and 2 indicate a revolvable direction of the bucket 9. A base end portion of the boom 6 is swingably attached to a front portion of the vehicle body 1 via a boom pin 14. A base end portion of the arm 7 is swingably attached to a tip portion of the boom 6 via an arm pin 15. A coupling member 8 is attached to a tip portion of the arm 7 via a bucket pin 16. The coupling member 8 is attached to the bucket 9 via a tilt pin 17. The coupling member 8 is coupled with the bucket cylinder 12 via a pin (not illustrated), and the bucket cylinder 12 expands/contracts, so that the bucket 9 swings (see SW illustrated in FIG. 1). That is, the bucket 9 is attached to revolve around an axis perpendicular to an extending direction of the arm 7. The boom pin 14, the arm pin 15, and the bucket pin 16 are arranged in a parallel position relationship. That is, central axes of the pins are in a mutually parallel position relationship.

Note that "perpendicular" described below means a position relationship in which two objects such as two lines (or axes), a line (axis) and a surface, or a surface and a surface, are perpendicular to each other. For example, a plane including one line (or axis) and a plane including another line (axis) are parallel, and when viewing one of the planes from the vertical direction, a state in which one line and another line are perpendicular to each other is expressed as "one line and another line are perpendicular to each other". The same applies to a line (axis) and a surface, and a surface and a surface.

(Bucket 9)

In the present embodiment, the bucket 9 is called tilt bucket. The bucket 9 is coupled with the arm 7 via the coupling member 8 and via the bucket pin 16. Further, in the coupling member 8, the bucket 9 is attached to the coupling member 8 at a side of the bucket 9 opposite to the side to which the bucket pin 16 is attached via the tilt pin 17. The tilt pin 17 is perpendicular to the bucket pin 16. That is, a plane including a central axis of the tilt pin 17 is perpendicular to a central axis of the bucket pin 16. As described above, the bucket 9 is attached to the coupling member 8 to be capable of revolving around the central axis of the tilt pin 17 via the tilt pin 17 (see the arrows TIL in FIGS. 1 and 2). With such a structure, the bucket 9 is capable of revolving around the central axis (first axis) of the bucket pin 16, and revolving around the central axis (second axis) of the tilt pin 17. The central axis extending in the axial direction of the bucket pin 16 is a first axis AX1, and the central axis in the extending direction of the tilt pin 17 perpendicular to the bucket pin 16 is a second axis AX2 that is perpendicular to the first axis AX1. Therefore, the bucket 9 can revolve around the first axis AX1 and revolve around the second axis AX2. That is, when a third axis AX3 in a perpendicular position relationship with both of the first axis AX1 and the second axis AX2 is a reference, the bucket 9 can revolve into right and left with respect to the reference (the arrow TIL illustrated in FIG. 2). By revolving the bucket 9 into either right or left, an edge 9T (to be specific, an edge array 9TG) can be tilted with respect to the ground.

The bucket 9 includes a plurality of blades 9B. The plurality of blades 9B is attached to the bucket 9 at an end portion at a side opposite to the side to which the tilt pin 17 of the bucket 9 is attached. The plurality of blades 9B is arranged in line into a direction perpendicular to the tilt pin 17, that is, in a parallel position relationship with the first axis AX1. The edge 9T is a tip portion of the blade 9B. In the present embodiment, the edge array 9TG refers to the plurality of edges 9T arranged and arrayed in line. The edge array 9TG is an aggregation of the edges 9T. To express the edge array 9TG, in the present embodiment, a straight line LBT connecting the plurality of edges 9T (hereinafter, appropriately referred to as edge array line) is used.

The tilt cylinder 13 couples the bucket 9 and the coupling member 8. That is, a tip of a cylinder rod of the tilt cylinder 13 is coupled with a body side of the bucket 9, and a cylinder tube side of the tilt cylinder 13 is coupled with the coupling member 8. In the present embodiment, while two tilt cylinders 13 and 13 couples the bucket 9 and the coupling member 8 at right and left both sides, at least one tilt cylinder 13 may just couples the both of the bucket 9 and the coupling member 8. One tilt cylinder 13 expands and the other tilt cylinder 13 contracts, so that the bucket 9 revolves around the tilt pin 17. As a result, the tilt cylinders 13 and 13 can tilt the edge 9T, to be more specific, the edge array 9TG that is an aggregation of the edges 9T and expressed by the edge array line LBT, with respect to the third axis AX3.

The expansion/contraction of the tilt cylinders 13 and 13 can be performed by an operation device such as a slide-type switch or a stepping-type pedal (not illustrated) within the operator cab 4. In a case where the operation device is the slide-type switch, the operator of the excavator 100 operates the slide-type switch, so that a hydraulic oil is supplied to/discharged from the tilt cylinders 13 and 13, the tilt cylinders 13 and 13 expand/contract. As a result, the tilt bucket (bucket 9) revolves (the edge 9T tilts) into right or left (the arrow TIL illustrated in FIG. 2) by the amount corresponding to the amount of operation based on the third axis AX3.

The bucket 9a illustrated in FIG. 3 is one type of tilt bucket, and is mainly used for constructing a slope. The bucket. 9a revolves around the central axis of the tilt pin 17. The bucket 9a includes one sheet of plate-like blade 9Ba at an end portion opposite to the side to which the tilt pin 17 is attached. The edge 9Ta that is a tip portion of the blade 9Ba is a linear portion in a direction perpendicular to the central axis of the tilt pin 17, that is, in a parallel position relationship with the first axis AX1 illustrated in FIG. 2, and extending toward the width direction of the bucket 9a. When the bucket 9a includes one blade 9Ba, the edge 9Ta and the edge array 9TGa indicate the same position. To express the edge 9Ta or the edge array 9TGa, in the present embodiment, the edge array line LBT is used. The edge array line LBT is a straight line in a direction into which the edge 9Ta extends.

As illustrated in FIG. 4, the length of the boom 6, that is, the length from the boom pin 14 to the arm pin 15 is L1. The length of the arm 7, that is, the length from the center of the arm pin 15 to the center of the bucket pin 16 is L2. The length of the coupling member 8, that is, the length from the center of the bucket pin 16 to the center of the tilt pin 17 is L3. The length L3 of the coupling member 8 is a radius of revolution of the bucket 9 when the bucket 9 revolves around the central axis of the bucket pin 16. The length of the bucket 9, that is, the length from the center of the tilt pin 17 to the center of the edge 9T of the bucket 9 is L4.

The boom cylinder 10, the arm cylinder 11, the bucket cylinder 12, and the tilt cylinder 13 illustrated in FIG. 1 are hydraulic cylinders, expansion/contraction and speeds of which are respectively adjusted and driven according to pressures of hydraulic oils (hereinafter, properly referred to as hydraulic pressure) or flow rates of the hydraulic oils. The boom cylinder 10 drives the boom 6 and causes the boom 6 to upwardly and downwardly swing. The arm cylinder 11 drives the arm 7 and causes the arm 7 to revolve around the central axis of the arm pin 15. The bucket cylinder 12 drives the bucket 9 and causes the bucket 9 to revolve around the central axis of the bucket pin 16. A proportional control valve 37 illustrated in FIG. 6 is arranged between the hydraulic cylinders of the boom cylinder 10, the arm cylinder 11, the bucket cylinder 12, and the tilt cylinder 13, and a hydraulic pump (not illustrated). A work machine electronic control device 26 described below controls the proportional control valve 37, so that flow rates of the hydraulic oil supplied to the boom cylinder 10, the arm cylinder 11, the bucket cylinder 12, and the tilt cylinder 13 are controlled. As a result, operations or the boom cylinder 10, the arm cylinder 11, the bucket cylinder 12, and the tilt cylinder 13 are controlled.

As illustrated in FIG. 4, a first stroke sensor 18A, a second stroke sensor 18B, and a third stroke sensor 180 and a bucket tilt sensor 18D as a bucket tilt detection unit are respectively provided to the boom 6, the arm 7, and the bucket 9. The first stroke sensor 18A, the second stroke sensor 18B, and the third stroke sensor 18C are posture detection units that detect a posture of the work machine 2. The first stroke sensor 18A detects a stroke length of the boom cylinder 10. A display control device 39 (see FIG. 6) described below calculates a tilt angle $\theta 1$ of the boom 6 with respect to a Za axis in a vehicle body coordinate system described below from the stroke length of the boom cylinder 10 detected by the first stroke sensor 18A. The second stroke sensor 18B detects a stroke length of the arm cylinder 11. The display control device 39 calculates a tilt angle $\theta 2$ of the arm 7 with respect to the boom 6 from the stroke length of the arm cylinder 11 detected by the second stroke sensor 18B. The third stroke sensor 180 detects a stroke length of the bucket cylinder 12. The display control device 39 calculates a tilt angle $\theta 3$ of the bucket 9 with respect to the arm 7 from the stroke length of the bucket cylinder 12 detected by the third stroke sensor 18C. The bucket tilt sensor 18D detects a tilt angle $\theta 4$ of the bucket 9, that is, the tilt angle $\theta 4$ of the edge ST or the edge array 9TG of the bucket 9 with respect to the third axis AX3. In the present embodiment, since the edge array 9TG is expressed by the edge array line LBT, as described above, the tilt angle $\theta 4$ of the bucket 9 is a tilt angle of the edge array line LBT with respect to the reference where the third axis AX3 is the reference.

As illustrated in FIG. 4, the vehicle body 1 includes a position detection unit 19. The position detection unit 19 detects a current position of the excavator 100. The position detection unit 19 includes two antennas 21 and 22 (hereinafter, properly referred to as GNSS antennas 21 and 22) used for a real time kinematic-global navigation satellite systems (RTK-GNSS, GNSS means global navigation satellite system), a three-dimensional position sensor 23, and a tilt angle sensor 24. The GNSS antennas 21 and 22 are installed on the vehicle body 1, to be more specific, on the upper swing body 3. In the present embodiment, the GNSS antennas 21 and 22 are installed away from each other by a certain distance along an Ya axis in the vehicle body coordinate system. Xa-Ya-Za described below.

Note that the GNSS antennas 21 and 22 may just be installed on the upper swing body 3 and disposed at both end positions away from each other in front-back direction (the Ya axis direction in the vehicle body coordinate system Xa-Ya-Za) or in the right-left direction (the Xa axis direction in the vehicle body coordinate system Xa-Ya-Za) of the excavator 100. Alternatively, the GSNN antennas 21 and 22 may be installed on the upper swing body 3, and disposed posterior to a counter weight (not illustrated) (rear end of the upper swing body 3) or to the operator cab 4. In either case, detection accuracy of the current position of the excavator 100 is improved when the GNSS antennas 21 and 22 are installed at positions away from each other as far as possible. Further, it is favorable to install the GNSS antennas 21 and 22 at positions not to hinder the view of the operator. In addition, vehicle states such as a current position and a posture of the excavating machine (the excavator 100 of the present embodiment) can be detected by the position detection unit 19 as a vehicle state detection unit and a posture detection unit.

A signal according to a GNSS radio wave received by the GNSS antennas 21 and 22 is input to the three-dimensional position sensor 23. The three-dimensional position sensor 23 detects installation positions P1 and P2 of the GNSS antennas 21 and 22. As illustrated in FIG. 5, the tilt angle sensor 24 detects a tilt angle $\theta 5$ (hereinafter, appropriately referred to as roll angle $\theta 5$) in the width direction of the vehicle body 1 with respect to the direction of action of gravity, that is, the vertical direction Ng. Note that, in the present embodiment, the width direction means a width direction of the bucket 9, and accords with a width direction of the upper swing body 3, that is, the right-left direction. However, in a case where the work machine 2 includes a tilt bucket described below, the width direction of the bucket 9 and the width direction of the upper swing body 3 may not accord with each other.

As illustrated in FIG. 6, the excavator 100 includes the operation device 25, the work machine electronic control device 26, a work machine control device 27, and a display system 101 of the excavating machine (hereinafter, appropriately referred to as a display system). The operation device 25 includes a work machine operation device 31, a work machine operation detection unit 32, a travel operation device 33, and a travel operation detection unit 34. The work machine operation device 31 is a device used for operating the work machine 2 by the operator, and is, for example, a joystick or an operation lever. Further, the work machine operation member 31 and the work machine operation detection unit 32 are two sets (only one set is illustrated in FIG. 6). The work machine operation members 31 are installed to right and left of an operator seat (not illustrated) in the operator cab 4. For example, the work machine operation member 31 installed on the right is operated, so that the bucket 9 and the boom 6 can be caused to work, and the work machine operation member 31 installed on the left is operated, so that the arm 7 and the upper swing body 3 can be caused to work. The work machine operation detection unit 32 detects operation content of the work machine operation device 31, and transmits the operation content to the work machine electronic control device 26 as a detection signal.

The travel operation device 33 is a device used for operating traveling of the excavator 100 by the operator, and is, for example, a joystick or an operating lever. Further, the travel, operation member 33 and the travel operation detection unit 34 are two sets (only one set is illustrated in FIG. 6). The travel operation members 33 are installed in line right and left anterior to an operator seat (not illustrated) in the operator cab 4. The travel operation member 33 installed on the right side is operated, so that the caterpillar band 5a on the right side can be caused to work, and the travel operation member 33 installed on the left side is operated, so that the caterpillar band 5b on the left side can be caused to work. The travel operation detection unit 34 detects operation content of the travel operation device 33, and transmits the operation content to the work machine electronic control device 26 as a detection signal.

As illustrated in FIG. 6, the work machine electronic control device 26 includes a work machine side storage unit 35 that includes at least one of a random access memory (RAM) and a read only memory (ROM) and an arithmetic unit 36 such as a central, processing unit (CPU). The work machine electronic control device 26 mainly controls the work machine 2. The work machine electronic control device 26 generates a control signal for causing the work machine 2 to work according to an operation of the work machine operation member 31, and outputs the signal to the work machine control device 27. The work machine control device 27 includes a proportional control valve 37, and the proportional control valve 37 is controlled based on a control signal from the work machine electronic control device 26. The hydraulic oil at a flow rate according to the control signal from the work machine electronic control device 26 flows out of the proportional control valve 37, and is supplied to at least one of the boom cylinder 10, the arm cylinder 11, and the bucket cylinder 12. The boom cylinder 10, the arm cylinder 11, the bucket cylinder 12, and the tilt cylinder 13 illustrated in FIG. 1 are driven according to the hydraulic oil supplied from the proportional control valve 37. As a result, the work machine 2 works.

<Display System 101>

A display system 101 is a system for providing the operator with information for excavating the ground in a work area to construct the ground into a shape like a design surface described below. The display system 101 includes stroke sensors such as a first stroke sensor 18A, a second stroke sensor 18E, and a third stroke sensor 18C, a display input device 38 as a display device, a display control device 39, and a sound generation device 46 including a speaker and the like for informing a warning sound, in addition to the three-dimensional position sensor 23, the tilt angle sensor 24, and the bucket tilt sensor 18D described above. Further, the display system 101 includes the position detection unit 19 illustrated in FIG. 4. As a matter of convenience, in FIG. 6, the three-dimensional position sensor 23 and the tilt angle sensor 24 in the position detection unit 19 are illustrated and the two antennas 21 and 22 are omitted.

The display input device 38 is a display device that includes a touch panel-type input unit 41 and a display unit 42 such as a liquid crystal display (LCD). The display input device 38 displays a guide screen for providing information for performing excavation. Further, the guide screen displays various keys. The operator as a manipulator (or a technician when the excavator 100 is inspected or fixed) can execute various types of functions of the display system 101 by touching the various keys on the guide screen. The guide screen will be described in detail below.

The display control device 39 executes the various functions of the display system 101. The display control device 39 is an electronic control device that includes a storage unit 43 including at least one of a RAM and a ROM, and a processing unit 44 such as a CPU. The storage unit 43 stores work machine data. The work machine data includes the length L1 of the boom 6, the length L2 of the arm 7, the length L3 of the coupling member 8, and the length L4 of the bucket 9 described above. When the bucket 9 is replaced, regarding the length L3 of the coupling member 8 and the length L4 of the bucket 9 as work machine data, values according to the size of the replaced bucket 9 are input from the input unit 41 and stored in the storage unit 43. Further, the work machine data includes a minimum value and a maximum value of each of the tilt angle θ1 of the boom 6, the tilt angle θ2 of the arm 7, and the tilt angle θ3 of the bucket 9. The processing unit 44 displays, on the display unit 42, the guide screen and posture information for guiding the operator of the excavator 100 about an operation of the bucket 9 by reading and executing a display computer program of excavating machine according to the present embodiment stored in the storage unit 43.

The display control device 39 and the work machine electronic control device 26 are communicatable to each other via, a wireless or wired communication means. The storage unit 43 of the display control device 39 stores design topographic data created in advance. The design topographic data is information related to a shape and a position of three-dimensional design topography and is information of the design surface 45. The design topography indicates a target shape of the ground, which is to be an object to be worked. The display control device 39 causes the display input device 38 to display the guide screen based on the design topographic data and information such as detection results from the various sensors described above. To be specific, as illustrated in FIG. 7, the design topography is made up of a plurality of design surfaces 45 that is expressed by triangle polygons. Note that, in FIG. 7, one of the plurality of design surfaces is denoted with the reference sign 45, and the reference signs of the other design surfaces are omitted. The target object to be worked is one or a plurality of design surfaces from among the design surfaces 45. The operator selects one or a plurality of design surfaces 45 from among the design surfaces 45 as a target surface 70. The target surface 70 is a surface to be excavated among the plurality of design surfaces 45. The display control device 39 causes the display input device 38 to display the guide screen for informing the operator of a position of the target surface 70.

<Guide Screen>

Figure 8:
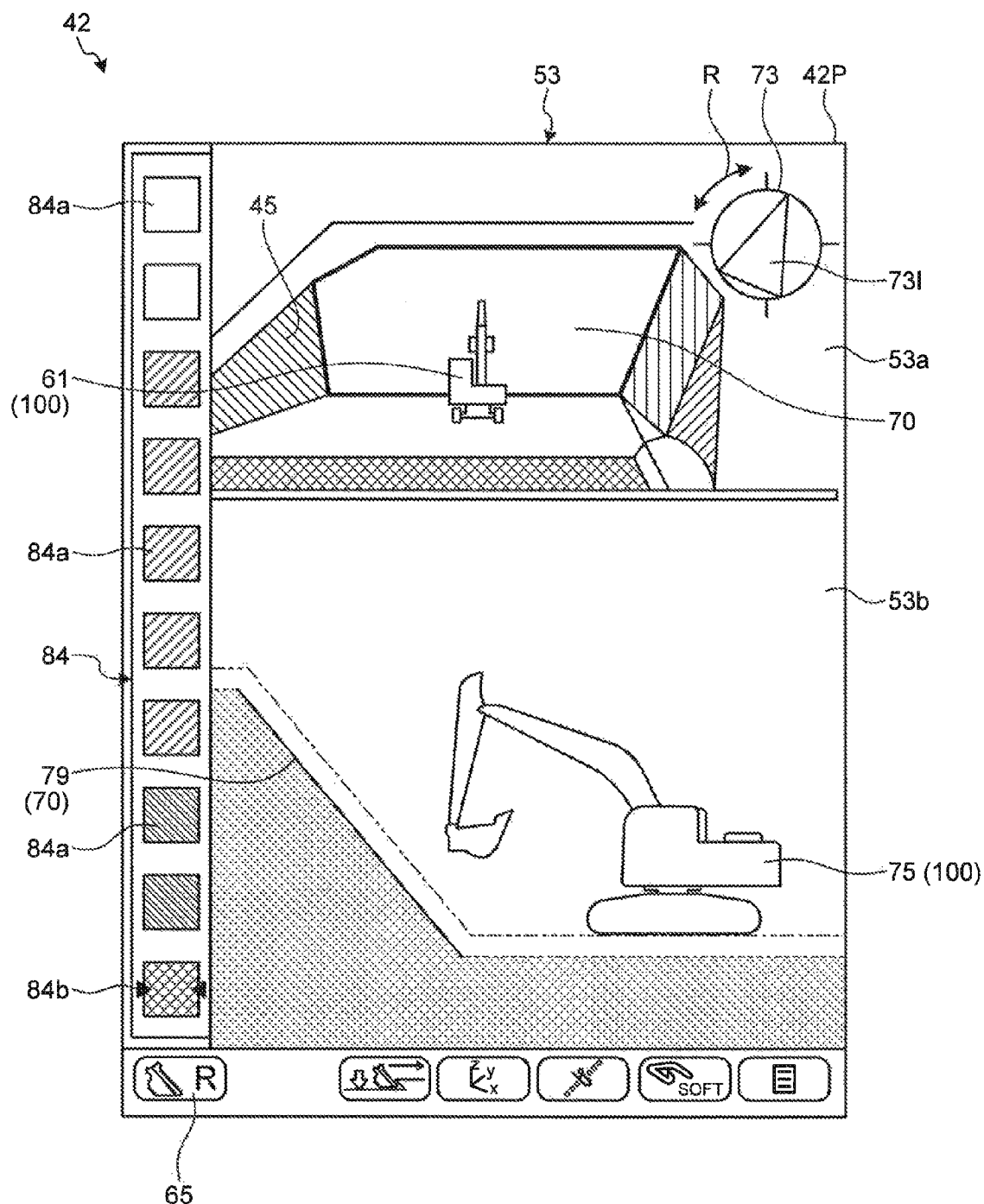
FIG. 8 is a diagram illustrating an example of a guide screen.
Figure 9:
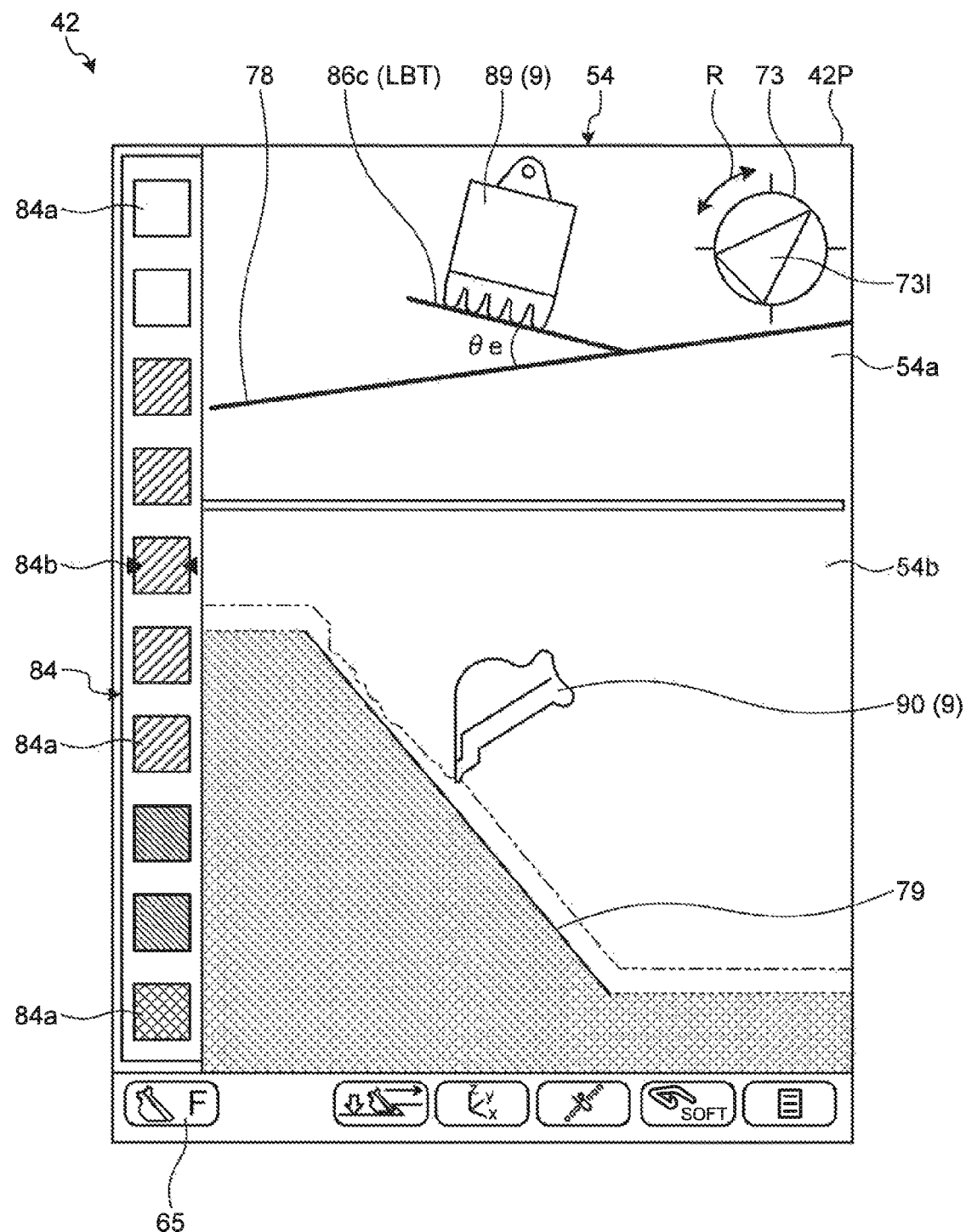
FIG. 9 is a diagram illustrating an example of a guide screen.

FIGS. 8 and 9 are diagrams illustrating examples of the guide screen. The guide screen is a screen that indicates a position relationship between the target surface 70 and the edge 9T of the bucket 9 and guides the operator of the excavator 100 about the work machine 2 so that the ground as the object to be worked can be formed into the same shape as the target surface 70. As illustrated in FIGS. 8 and 9, the guide screen includes a guide screen in a rough excavation mode (hereinafter, appropriately referred to as rough excavation screen 53) and a guide screen in a fine excavation mode (hereinafter, appropriately referred to as fine excavation screen 54).

(An Example of Rough Excavation Screen 53)

The rough excavation screen 53 illustrated in FIG. 8 is displayed on a screen 42P of the display unit 42. The rough excavation screen 53 includes a front view 53a that illustrates the design topography of a work area (the design surface 45 including the target surface 70) and the current position of the excavator 100, and a side view 53b that illustrates the position relationship between the target surface 70 and the excavator 100. The front view 53a of the rough excavation screen 53 expresses the design topography in a front view with a plurality of triangle polygons. FIG. 8 illustrates a state in which, when the design topography is a slope, the excavator 100 faces the slope. Therefore, in the front view 53a, the design surface that expresses the design topography tilts when the excavator 103 tilts.

Further, the target surface 70 selected from among the plurality of design surfaces 45 (only one design surface is denoted with the reference sign in FIG. 8) as the target object to be worked is displayed in a different color from the other design surfaces 45. Note that, in the front view 53a of FIG. 8, the current position of the excavator 100 is indicated by an icon 61 of the excavator 100 in a back view. However, the current position may be indicated by other symbols. Further, the front view 53a includes information for causing the excavator 100 to face the target surface 70. The information for causing the excavator 100 to face the target surface 70 is displayed as a facing compass 73. The facing compass 73 is posture information such as a picture or an icon in which an indicator 73I having an arrow shape rotates in an arrow R direction, and guides a facing direction with respect to the target surface 70 and a direction into which the excavator 100 is to be revolved, or a direction into which the bucket 9 is tilted with respect to the third axis AX3. The posture information is information related to a posture of the bucket 9, and includes a picture, a numerical value, a number, and the like. Note that, to cause the excavator 100 to face the target surface 70, the traveling device 5 may be caused to work, so that the excavator 100 is moved to face the target surface 70. The operator of the excavator 100 can confirm the degree of facing to the target surface 70 by the facing compass 73. The facing compass 73 rotates according to the degree of facing to the target surface 70, and when the excavator 100 or the bucket 9 faces the target surface 70, for example, the indication direction of the indicator 73I faces upward of the screen 42P when seen from the operator, for example. For example, when the indicator 73I has a triangular shape, as illustrated in FIG. 8, as the apex of the triangle points more upward, the excavator 100 or the bucket 9 more faces the target surface 70. Therefore, the operator can easily cause the excavator 100 or the bucket 9 to face the target surface 70 by operating the excavator 100 based on a rotation angle of the indicator 73I.

The side view 53b of the rough excavation screen 53 includes an image that indicates the position relationship between the target surface 70 and the edge 9T of the bucket 9, and distance information that indicates the distance between the target surface 70 and the edge 9T of the bucket 9. To be specific, the side view 53b includes a target surface line 79, and an icon 75 of the excavator 100 in a side view. The target surface line 79 indicates a cross section of the target surface 70. The target surface line 79 is obtained by, as illustrated in FIG. 7, calculating a line of intersection 80 of a plane 77 that passes through the current position of the edge 9T of the bucket 9 and the design surface 45. The line of intersection 80 is obtained by the processing unit 44 of the display control device 39. A method of obtaining the current position of the edge 9T of the bucket 9 will be described below.

In the side view 53b, the distance information that indicates the distance between the target surface 70 and the edge 9T of the bucket 9 includes graphic information 84. The distance between the target surface 70 and the edge 9T of the bucket 9 is a distance between a point at which a line drawn down from the edge 9T toward the target surface 70 in the vertical direction (the direction of gravity) intersects with the target surface 70, and the edge 9T. Alternatively, the distance between the target surface 70 and the edge 9T of the bucket 9 may be a distance between a point of intersection when a perpendicular is drawn down to the target surface 70 from the edge 9T (the perpendicular and the target surface 70 intersect with each other at right angle) and the edge 9T. The graphic information 84 is information graphically indicating the distance between the edge 9T of the bucket 9 and the target surface 70. The graphic information 84 is a guidance index for indicating the position of the edge 91 of the bucket 9. To be specific, the graphic information 84 includes index bars 84a, and an index mark 84b that indicates a position at which the distance between the edge of the bucket 9 and the target surface 70 from among the index bars 84a corresponds to zero. The index bars 84a are lighted up according to a shortest distance between a tip of the bucket 9 and the target surface 70. Note that ON/OFF of the display of the graphic information 84 may be able to be changed by an operation of the input unit 41 by the operator of the excavator 100.

A distance (numerical value, not illustrated) for indicating a position relationship between the target surface line 79 and the excavator 100 as described above may be displayed on the rough excavation screen 53. The operator of the excavator 100 can easily excavate the ground so that the current topography becomes the design topography by moving the edge 9T of the bucket 9 along the target surface line 79. Note that a screen switching key 65 for switching the guide screen is displayed on the rough excavation screen 53. The operator can switch from the rough excavation screen 53 to the fine excavation screen 54 by operating the screen switching key 65.

(An Example of Fine Excavation Screen 54)

The fine excavation screen 54 illustrated in FIG. 9 is displayed on the screen 42P of the display unit 42. The fine excavation screen 54 indicates the position relationship between the target surface 70 and the excavator 100 in more detail than the rough excavation screen 53. That is, the fine excavation screen 54 indicates the position relationship between the target surface 70 and the edge 9T of the bucket 9 in more detail than the rough excavation screen 53. The fine excavation screen 54 includes a front view 54a that illustrates the target surface 70 and the bucket 9, and a side view 54b that illustrates the target surface 70 and the bucket 9. The front view 54a of the fine excavation screen 54 includes an icon 89 that indicates the bucket 9 in a front view, and a line 78 that indicates a cross section of the target surface 70 in a front view (hereinafter, appropriately referred to as target surface line 78). The front view is viewing the bucket 9 from a direction perpendicular to the extending direction of the central axis of the bucket pin 16 illustrated in FIGS. 1 and 2 (the revolutional central axis direction of the bucket 9) and from the rear of the excavator 100.

The target surface line 78 can be obtained as follows. When a perpendicular is drawn down from the edge 9T of the bucket 9 in the vertical direction (the direction of gravity), a line of intersection caused when a plane including the perpendicular intersects with the target surface 70 is the target surface line 78. That is, it is the target surface line 78 in the global coordinate system. Alternatively, when a line is drawn down from the edge 9T of the bucket 9 toward the target surface 70, a line of intersection made when a plane including the line intersects with the target surface 70 may be the target surface line 78 on condition that the line is in a parallel position relationship with a line in the up-down direction of the vehicle body 1. That is, it is the target surface line 78 in the vehicle body coordinate system. Which of the coordinate systems is used for displaying the target surface line 78 can be selected by the operator by operating a switching key (not illustrated) in the input unit 41.

An icon 90 of the bucket 9 in a side view and the target surface line 79 are included in the side view 54b of the fine excavation screen 54. Further, information indicating a position relationship between the target surface 70 and the bucket 9 described below is displayed in each of the front view 54a and the side view 54b of the fine excavation screen 54. The side view is viewing from the extending direction of the central axis of the bucket pin 16 illustrated in FIGS. 1 and 2 (revolutional central axis direction of the bucket 9) and from a left side of the excavator 100.

The information indicating the position relationship between the target surface 70 and the bucket 9 includes tilt information 86c of the bucket 9 in the front view 54a. The tilt information 86c indicates a tilt of the edge 9T of the bucket 9 with respect to the target surface 70. To be specific, the tilt information 86c indicates the magnitude of an angle between the edge array line LBT passing through the edge 9T of the bucket 9 and the target surface line 78 ($\theta$e illustrated in FIG. 9). The front view 54a may include distance information indicating a distance between the edge 9T and the target surface 70 in a Za direction in the vehicle body coordinate system (or in a Z direction in the global coordinate system) as the information indicating the position relationship between the target surface 70 and the bucket 9. This distance is a distance between a closest position to the target surface 70 among the positions in the width direction of the edge 9T of the bucket 9, and the target surface 70. That is, as described above, the distance between the target surface 70 and the edge 9T of the bucket 9 may be a distance between a point at which a line drawn down from the edge 9T toward the target surface 70 in the vertical direction intersects with the target surface 70, and the edge 9T. Alternatively, the distance between the edge 9T of the bucket 9 and the target surface 70 may be a distance between a point of intersection caused when a perpendicular is drawn down from the edge 9T to the target surface 70 (the perpendicular and the target surface 70 are perpendicular to each other), and the edge 9T.

The fine excavation screen 54 includes the graphic information 84 that graphically indicates the distance between the edge 9T of the bucket 9 and the target surface 70 described above. The graphic information 84 includes the index bars 84a and the index mark 84b similarly to the graphic information 84 of the rough excavation screen 53. As described above, the relative position relationship between the target surface lines 78 and 79 and the edge 9T of the bucket 9 is displayed on the fine excavation screen 54 in detail. The operator of the excavator 100 can more easily and accurately excavate the ground so that current topography is formed into the same shape as three-dimensional design topography by moving the edge 9T of the bucket 9 along the target surface lines 78 and 79. Note that the screen switching key 65 is displayed on the fine excavation screen 54 similarly to the above-described rough excavation screen 53. The operator can switch the fine excavation screen 54 to the rough excavation screen 53 by operating the screen switching key 65. Next, control of displaying posture information (hereinafter, appropriately referred to as posture information display control) on the screen 42P of the display unit. 42 in the excavator 100 that includes a tilt bucket will be described, where the posture information (for example, a picture, a numerical value, a number, and the like) is provided for providing the operator of the excavator 100 with an index of operation.

<An Example of Posture Information Display Control>

Figure 10:
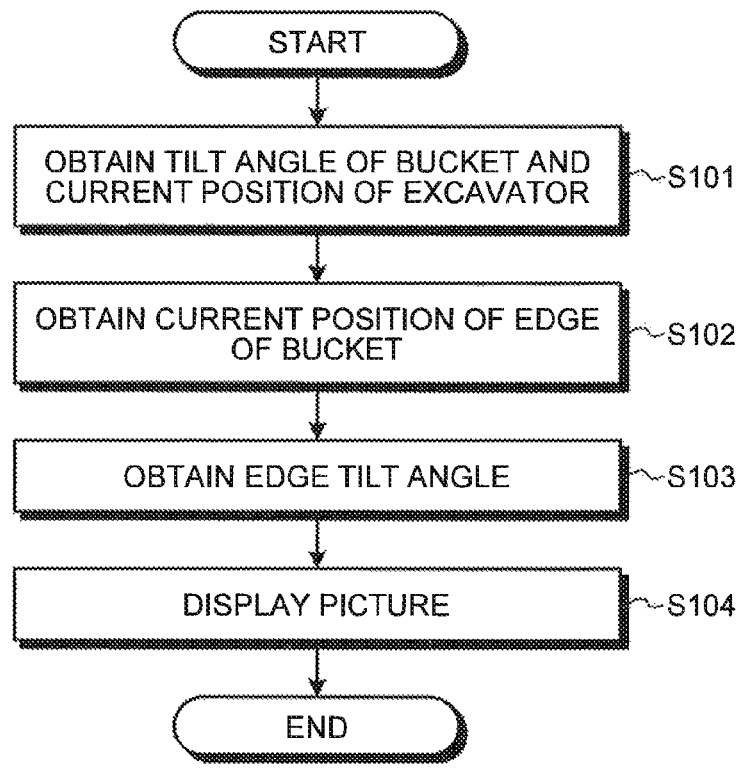
FIG. 10 is a flowchart illustrating an example of posture information display control.

FIG. 10 is a flowchart illustrating an example of posture information display control. In the present embodiment, the posture information display control is realized by the display control device 39 included in the display system 101 illustrated in FIG. 6. To execute the posture information display control, in step S101, the display control device 39, to be more specific, the processing unit 44 obtains the tilt angle θ4 of the bucket 9 (hereinafter, appropriately referred to as bucket tilt angle) and the current position of the excavator 100. The bucket tilt angle θ4 is detected by the bucket tilt sensor 18D illustrated in FIGS. 4 and 6. Further, the current position of the excavator 100 is detected by the GNSS antennas 21 and 22 and the three-dimensional position sensor 23 illustrated in FIG. 6. The processing unit 44 obtains information indicating the bucket tilt angle θ4 from the bucket tilt sensor 18D, and obtains information indicating the current position of the excavator 100 from the three-dimensional position sensor 23.

Next, the processing proceeds to step S102, and the processing unit 44 obtains the current position of the edge 9T of the bucket 9 (hereinafter, appropriately referred to as current edge position). The current edge position is obtained based on the bucket tilt angle θ4 that is the tilt angle of the bucket 9 with respect to the third axis AX3 illustrated in FIG. 2 or 4 and information related to the current position and the posture of the excavator 100. Next, an example of a technique of obtaining the current edge position.

(An Example of Technique of Obtaining Current Edge Position)

Figure 11:
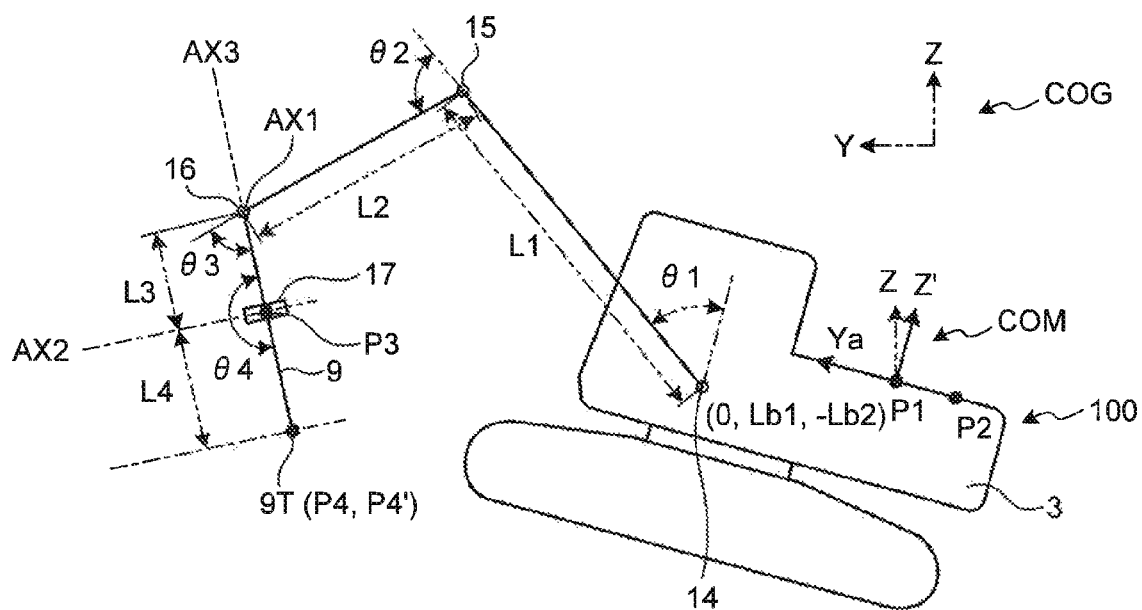
FIG. 11 is a diagram for describing an example of a method of obtaining current edge position.
Figure 12:
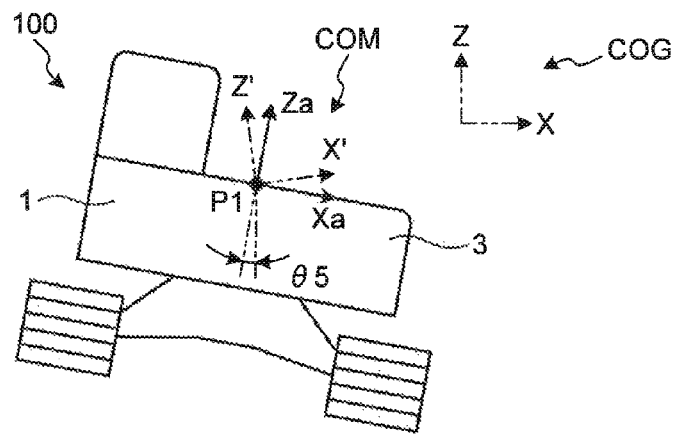
FIG. 12 is a diagram for describing an example of a method of obtaining a current edge position.
Figure 13:
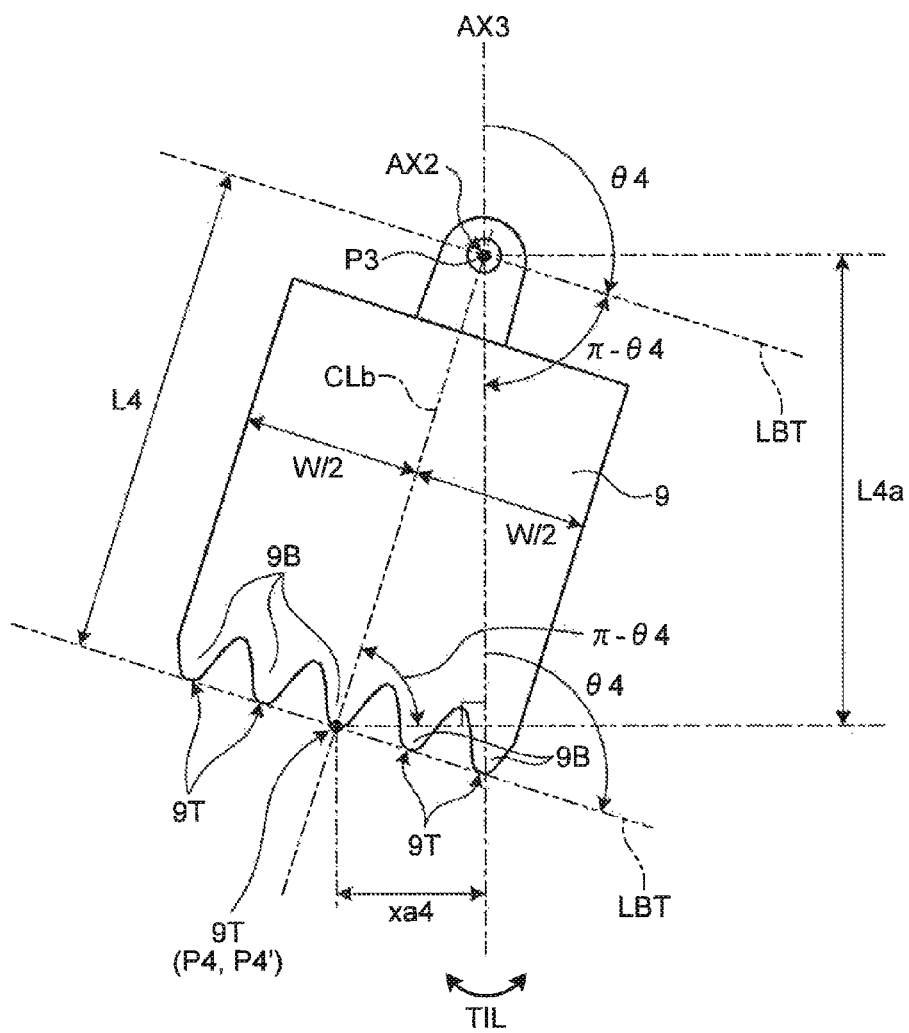
FIG. 13 is a diagram for describing an example of a method of obtaining a current edge position.
Figure 14:
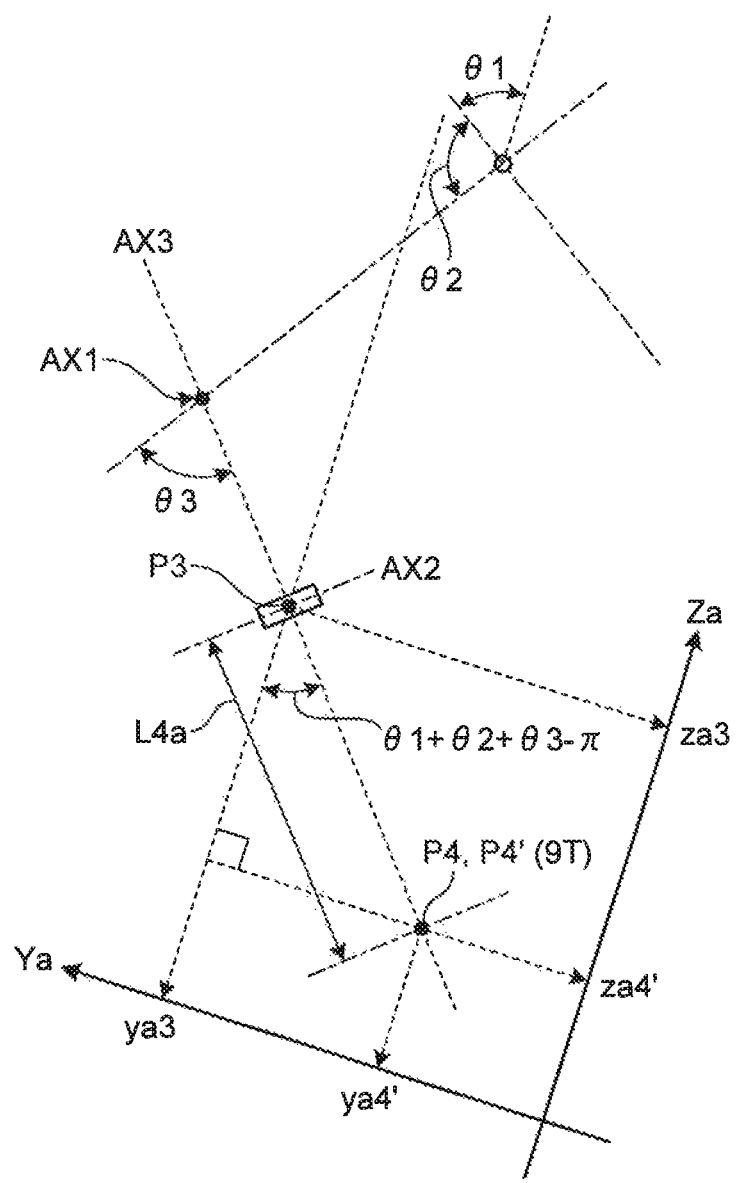
FIG. 14 is a diagram for describing an example of a method of obtaining a current edge position.

FIGS. 11 to 14 are diagrams for describing an example of method of obtaining a current edge position. FIG. 11 is a side view of the excavator 100, FIG. 12 is a back view of the excavator 100, FIG. 13 is a diagram illustrating a tilting bucket 9, and FIG. 14 is a diagram illustrating a current edge position on the Ya-Za plane in the vehicle body coordinate system. In the present technique, the current edge position is a position of the edge 9T in the width direction center of the bucket 9. In obtaining the current edge position, the display control device 39 obtains the vehicle body coordinate system. [Xa, Ya, Za] using the installation position P1 of the GNSS antenna 21 as the origin, as illustrated in FIG. 11. In the present example, assume that the front-back direction of the excavator 100, that is, the Ya axial direction of the coordinate system (vehicle body coordinate system) COM of the vehicle body 1 tilts with respect to the Y axial direction of a global coordinate system COG. In addition, the coordinates of the boom pin 14 in the vehicle body coordinate system CON is (0, Lb1, −Lb2), and is stored in the storage unit 43 of the display control device 39 in advance.

The three-dimensional position sensor 23 illustrated in FIGS. 4 and 6 detects (calculates) the installation positions P1 and P2 of the GNSS antennas 21 and 22. The processing unit 44 obtains the coordinates of the detected installation positions P1 and P2, and calculates a unit vector in the Ya axial direction using Expression (1). In Expression (1), P1 and P2 express the respective coordinates of the installation positions P1 and P2.

$$Ya = (P1-P2)/|P1-P2| \quad (1)$$

As illustrated in FIG. 11, the relationship between Expression (2) and Expression (3) is established where a vector Z' passing through a plane expressed by two vectors of Ya and Z, and perpendicular to Ya is introduced, "C" is a constant of Expression (3). Z' is expressed by Expression (4) from Expressions (2) and (3). Further, X' is expressed by Expression (5) where a vector perpendicular to Ya and Z' is X'.

$$(Z', Ya) = 0 \quad (2)$$

$$Z' = (1-c) \times Z + c \times Ya \quad (3)$$

$$Z' = Z + \{(Z, Ya)/((Z, Ya)-1)\} \times (Ya-Z) \quad (4)$$

$$X' = Ya \perp Z \quad (5)$$

As illustrated in FIG. 12, the vehicle body coordinate system COM is obtained by revolving the coordinate system [X', Ya, Z'] around the Ya axis by the above-described role angle θ5. Therefore, the vehicle body coordinate system is expressed by Expression (6).

$$[Xa \ Ya \ Za] = [X' \ Ya \ Z'] \begin{bmatrix} \cos\theta 4 & 0 & \sin\theta 4 \\ 0 & 1 & 0 \\ -\sin\theta 4 & 0 & \cos\theta 4 \end{bmatrix} \quad (6)$$

Further, the processing unit 44 obtains detection results of the first stroke sensor 18A, the second stroke sensor 18B, and the third stroke sensor 18C, and obtains the current tilt angles θ1, θ2, and θ3 of the boom 6, the arm 7, and the bucket 9 using the obtained detection results. The coordinates P3 (xa3, ya3, za3) of the second axis AX2 in the width direction center of the tilt pin 17 in the vehicle body coordinate system COM can be obtained by Expressions (7), (8), and (9) using the tilt angles θ1, θ2, and θ3, and the lengths L1, L2, and L3 of the boom 6, the arm 7, and the coupling member 8.

$$xa3=0 \quad (7)$$

$$ya3=Lb1+L1\times\sin\theta1+L2\times\sin(\theta1+\theta2)+L3\times\sin(\theta1+\theta2+\theta3) \quad (8)$$

$$za3=-Lb2+L1\times\cos\theta1+L2\times\cos(\theta1+\theta2)+L3\times\cos(\theta1+\theta2+\theta3) \quad (9)$$

A coordinates P4' (xa4, ya4, za4) of the current edge position based on the coordinates P3 (xa3, ya3, za3) in the vehicle body coordinate system COM can be obtained by Expressions (10), (11), and (12) using the bucket tilt angle θ4 detected by the bucket tilt sensor 18D and the length L4 of the bucket 9. Expression (10) is an expression of obtaining a distance of xa4 illustrated in FIG. 13. Expression (11) is an expression of obtaining a distance (ya4) between the coordinates ya3 and ya4' illustrated in FIG. 14. Expression (12) is an expression of obtaining a distance (za4) between the coordinates za3 and za4' illustrated in FIG. 14. The coordinates P4' (xa4, ya4, za4) is, as illustrated in FIG. 13, coordinates of the edge 9T at a position of a central axis CLb of the bucket 9 in the width direction, that is, at a position of a half of the width W of the bucket 9 from both sides of the bucket 9 (W×(1/2)=W/2).

$$xa4=L4\times\cos(\pi-\theta4) \quad (10)$$

$$ya4=L4\times\sin(\pi-\theta4)\times\sin(\theta1+\theta2+\theta3-\pi) \quad (11)$$

$$za4=L4\times\sin(\pi-\theta4)\times\cos(\theta1+\theta2+\theta3-\pi) \quad (12)$$

The coordinates P4' (xa4, ya4, za4) is a position of the edge 9T in the width direction center of the bucket 9 when the bucket 9 tilts by the tilt angle θ4 with respect to the third axis AX3, as illustrated in FIG. 13. The bucket tilt angle θ4 is an angle of the edge array line LBT that is a straight line connecting the edges 9T of the plurality of blades 9B based on the third axis AX3. When the bucket tilt angle θ4 is viewed from the upper swing body 3 side of the excavator 100, the clockwise direction is a positive direction. As can be seen from FIG. 13, xa4 can be obtained like Expression (10) using the bucket tilt angle θ4 and the length L4 of the bucket 9. Further, as can be seen from FIG. 14, ya4 and za4 can be obtained like Expressions (11) and (12) using the tilt angles θ1, θ2, θ3, and θ4, and the length L4 of the bucket 9. As illustrated in FIG. 13, a distance L4a obtained by calculating L4×sin(π−θ4) is the distance L4a illustrated in FIG. 14.

As described above, the coordinates P4' (xa4, ya4, za4) are based on the coordinates P3 (xa3, ya3, za3) of the second axis AX2. Therefore, the coordinates (xat, yet, zat) of the edge 9T of the bucket 9 in the vehicle body coordinate system COM can be, as can be seen from FIG. 14, obtained using the coordinates P3 (xa3, ya3, za3), the coordinates P4' (xa4, ya4, za4) and using Expressions (13), (14), and (15). The coordinates P4 (xat, yat, zat) of the current edge position in the vehicle body coordinate system COM is the coordinates of the edge 9T in the width direction center of the bucket 9, similar to the coordinates P4' (xa4, ya4, za4). The edge 9T of the bucket 9 moves within the Ya-Za plane in the vehicle body coordinate system COM. The coordinates P4G of the current edge position in the global coordinate system COG can be obtained by Expression (16).

$$xat=xa3-xa4 \quad (13)$$

$$yat=ya3-ya4 \quad (14)$$

$$zat=za3-za4 \quad (15)$$

$$P4G=xat\cdot Xa+yat\cdot Ya+zat\cdot Za+P1 \quad (16)$$

The processing unit 44 moves the processing onto step S103 after obtaining the current edge position in the global coordinate system COG in step S102. In step S103, the processing unit 44 obtains the angle between the edge 9T and the target surface 70 from the current edge position obtained in step S102 as the edge tilt angle.

Note that, for example, when obtaining the target surface line 79 illustrated in FIGS. 8 and 9, and the like, the processing unit 44 calculates the line of intersection 80 of the three-dimensional design topography and the Ya-Za plane 77 that passes through the edge 9T of the bucket 9 (plane 77 in the vehicle body coordinate system) as illustrated in FIG. 7 based on the current edge position calculated as described above and the design topographic data stored in the storage unit 43. The processing unit 44 then displays a portion in the line of intersection 80, which passes through the target surface 70 on the guide screen as the above-described target surface line 79. Note that the line of intersection 80 may be calculated with the Y-Z plane 77 in the global coordinate system, and which coordinate system is used for calculation can be changed by the operator operating a switching key (not illustrated) of the input unit 41. Next, a technique of obtaining the edge tilt angle will be described.

(Edge Tilt Angle)

Figure 15:
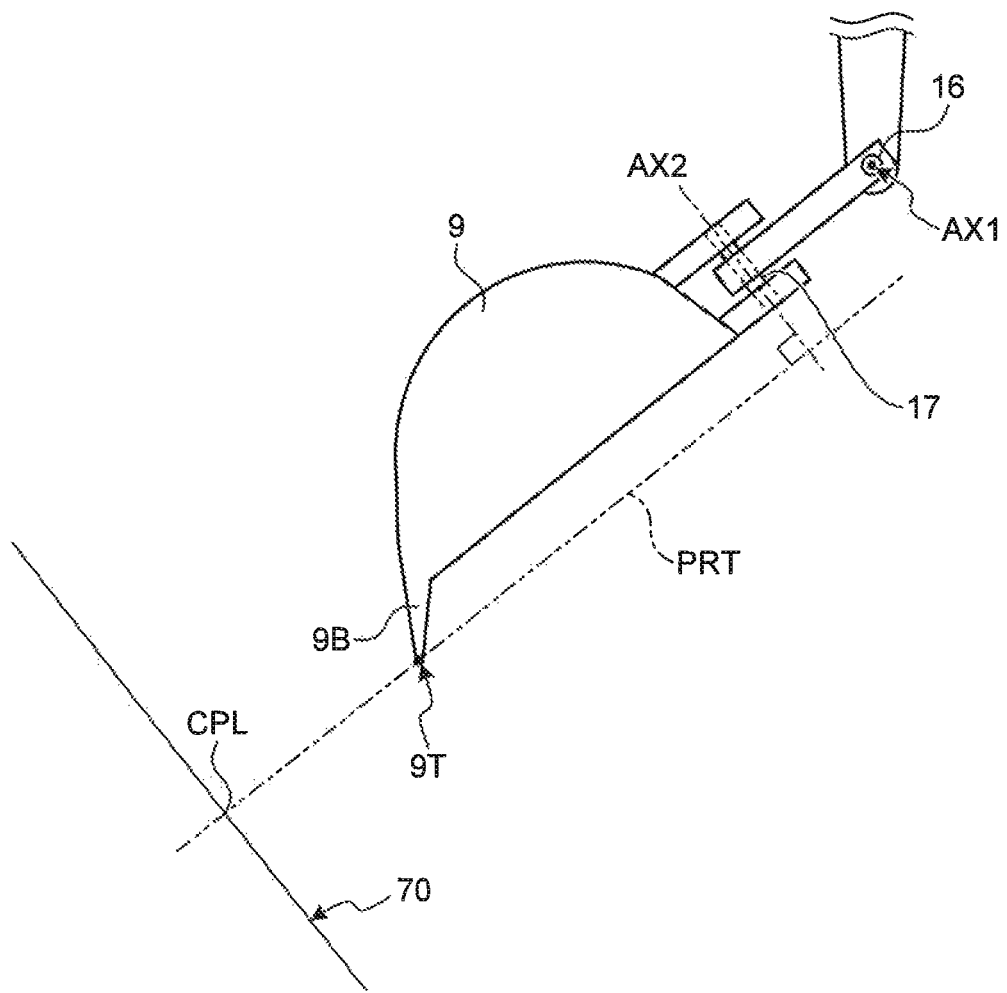
FIG. 15 is an explanatory diagram of a technique of obtaining an edge tilt angle.
Figure 16:
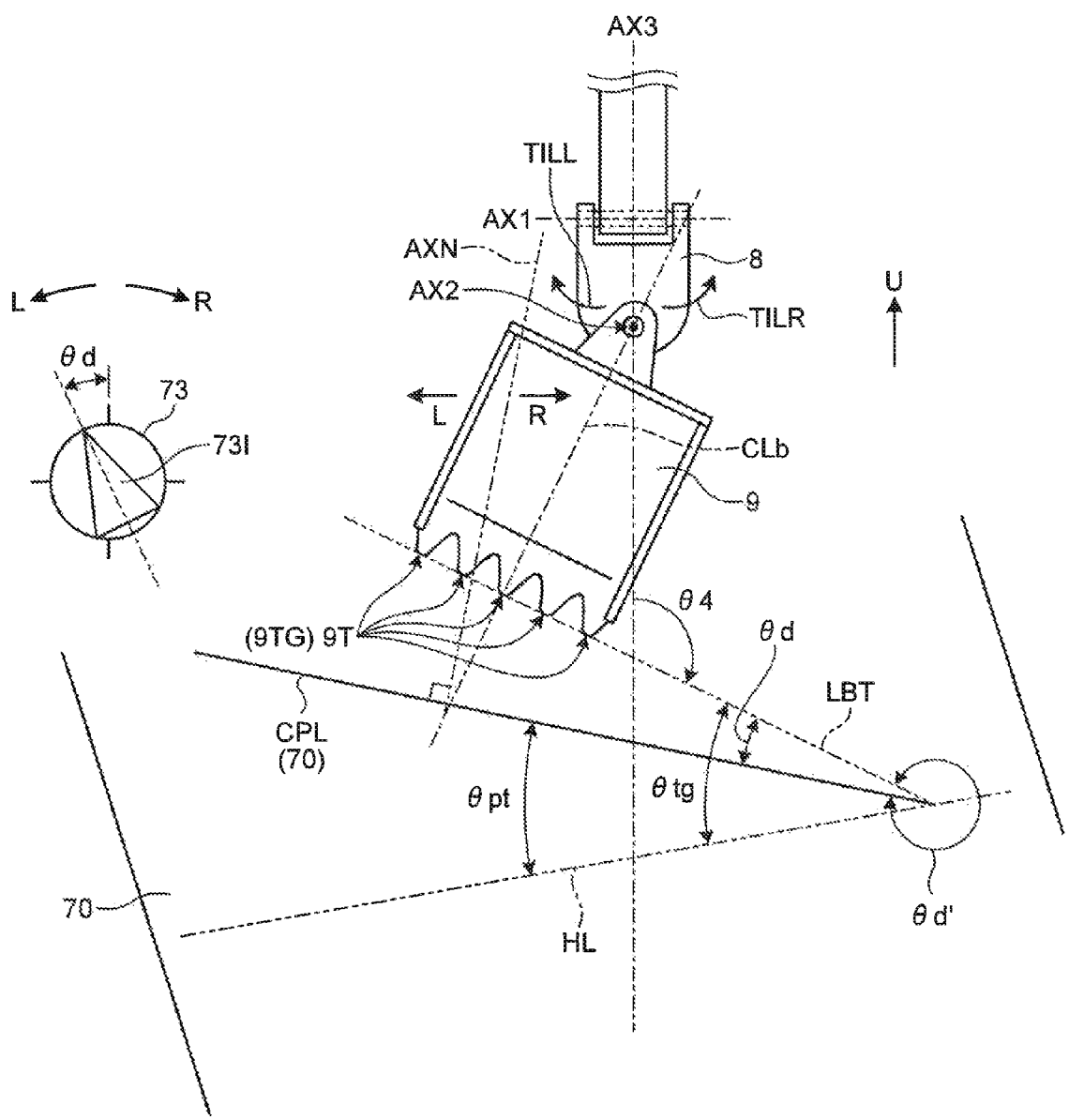
FIG. 16 is an explanatory diagram of a technique of obtaining an edge tilt angle.

FIGS. 15 and 16 are explanatory diagrams of a technique of obtaining an edge tilt angle. An edge tilt angle θd illustrated in FIG. 16 is an angle θd made by a line of intersection CPL of a tilt revolution surface PRT and a target surface 70 illustrated in FIG. 15, and the edge 9T, to be specific, the edge array line LBT. The angle between the line of intersection CPL and the edge array line LBT includes an angle θd' as illustrated in FIG. 16. A smaller angle of the angle θd and the angle θd' is selected. The tilt revolution surface PRT is a plane perpendicular to the second axis AX2 that is the central axis of the tilt pin 17, and passing through at least a part of the bucket 9. In the present embodiment, the tilt revolution surface PRT passes through the edge 9T of the blade 9E included in the bucket 9. To be more specific, the tilt revolution surface PRT passes through the plurality of edges 9T. Therefore, the edge array line LBT that is a straight line connecting the edges 9T of the plurality of blades 9E is in a parallel position relationship with the tilt revolution surface PRT, and is included in the tilt revolution surface PRT.

The tilt revolution surface PRT is perpendicular to (intersects with) the target surface 70. The angle between the line of intersection CPL of the two surfaces and the edge array line LBT represents the degree of tilt of the bucket 9, to be more specific, the edge 9T, with respect to the target surface 70. Therefore, the angle between the line of intersection CPL of the two surfaces and the edge array line LBT is used as the edge tilt angle θd.

When obtaining the tilt revolution surface PRT, for example, the processing unit 44 obtains the second axis AX2 from the position of the bucket 9, calculates a plane perpendicular to the second axis AX2, positioning in the axial direction of the second axis AX2, and passing through a portion of the bucket 9, and uses the obtained plane as the tilt revolution surface PRT. In the present embodiment, the tilt revolution surface PRT passes through a plurality of edges 9T of the bucket 9. Therefore, the processing unit 44 uses a plane perpendicular to the second axis AX2 and passing through the plurality of edges 9T, to be more specific, the edge array line LBT as the tilt revolution surface PRT. The position of the bucket 9 (edge 9T) can be obtained from the information detected by the three-dimensional position sensor 23 and the tilt angle sensor 24, the information of the tilt angles θ1, θ2, and θ3 detected by the first, second, and third stroke sensors 18A, 18B, and 18C, and the tilt angle θ4 detected by the bucket tilt sensor 18D, and the like. The edge array line LBT can be obtained using the current edge position obtained in step S102. For example, the processing unit 44 can obtain a straight line (the LBT illustrated by the two-dot chain line in FIG. 16) passing through the current edge position, perpendicular to the second axis AX2, and tilting by the tilt angle θ4 with respect to the third axis AX3 as the edge array line LBT. The edge array line LBT is obtained in the global coordinate system COG.

Next, the processing unit 44 calculates the line of intersection CPL of the tilt revolution surface PRT and the target surface 70. At this time, the processing unit 44 obtains the line of intersection CPL based on the position information of the target surface 70 obtained from the design topography data created in advance and stored in the storage unit 43 of the display control device 39 illustrated in FIG. 6, and the position information of the tilt revolution surface PRT. The line of intersection CPL is obtained in the global coordinate system COG, for example.

Next, the processing unit 44 obtains an angle θtg made by a reference position (an axis or a surface) HL and the edge array line LBT in the global coordinate system COG, and an angle θpt made by the reference position HL and the line of intersection CPL. The processing unit 44 then obtains a difference between the θtg and the θpt, and uses the difference as the edge tilt, angle θd. With the above-described technique, the processing unit 44 can obtain the edge tilt angle θd.

In the above-described example, for convenience of description, the edge array line LBT and the line of intersection CPL are obtained in the global coordinate system COG. However, the coordinate systems between the two may just be the same when the edge tilt angle θd is obtained. Therefore, the processing unit 44 obtains the edge array line LBT and the tilt revolution surface PRT in the vehicle body coordinate system COM, for example, and converts the target surface 70 into the vehicle body coordinate system COM, thereby to obtain the line of intersection CPL in the vehicle body coordinate system COM, and to obtain the edge tilt angle θd.

When having obtained the edge tilt angle θd in step S103, in step S104, the processing unit 44 displays the posture information that indicates information related to a posture of the bucket 9 on the screen 42P of the display unit 42 based on the obtained edge tilt angle θd. The posture information that indicates information related to the bucket 9 is, for example, the facing compass 73 expressed by a picture. The example illustrated in FIG. 16 illustrates the facing compass 73, for convenience. In reality, the facing compass 73 may be displayed in the front view 53a of the rough excavation screen 53 displayed on the screen 42P of the display unit 42 illustrated in FIG. 8, for example, or may be displayed in the front view 54a of the fine excavation screen 54 displayed on the screen 42P of the display unit 42 illustrated in FIG. 9. In the next description, assume that the facing compass 73 is displayed on the screen 42P of the display unit 42.

In the present embodiment, the processing unit 44 displays the angle of the indicator 73I of the facing compass 73 in a form illustrating an angle according to the magnitude of the edge tilt angle θd. That is, when the up-down direction of the screen 42P of the display unit 42 is a reference (an angle of 0 degree), the indicator 73I is tilted into either right or left with respect to the reference by an angle corresponding to the edge tilt angle θd (θd illustrated in the drawing of the facing compass 73 illustrated in the left side of FIG. 16) and displayed. This enables the operator of the excavator 100 to intuitively grasp to what extent the edge 9T or the edge array 9TG of the bucket 9 tilt with respect to the target surface 70. As a result, the operator can intuitively grasp to what extent revolving the bucket 9 around the second axis AX2 can cause the bucket 9 to face the target surface 70, and therefore, the work efficiency can be improved.

As described above, the processing unit 44 informs the operator of the excavator 100 of an index for operation: the facing compass 73 as the information for supporting the operator (manipulator). In the present embodiment, the facing compass 73 can display the degree of tilt of the bucket 9 with respect to the target surface 70 as an index for operation, thereby supporting the operation of the operator. As described above, the display system can provide an operator of an excavating machine including a tilt bucket with information for supporting an operation. This information is effective for supporting the operation of the operator especially when a bucket 9 as the tilt bucket is caused to face the target surface 70.

The processing unit 44 uses a tilt of the indicator 73I of the facing compass 73 as the edge tilt angle θd, as described above and illustrated in FIG. 16. Further, the processing unit 44 tilts and displays the direction of the tilt of the indicator 73I in a direction opposite to a direction into which the width direction central axis CLb of the bucket 9 is tilted with respect to an axis AXN perpendicular to the line of intersection CPL and the target surface 70 (see FIG. 16) when the bucket 9 is viewed from the operator cab 4 side of the excavator 100. In the example illustrated in FIG. 16, the width direction central axis CLb is tilted toward the right side with respect to the axis AXN (in the R direction illustrated in FIG. 16). Therefore, the indicator 73I is tilted and displayed to the left (in the L direction illustrated in FIG. 16) with respect to an upper part of the screen (the direction indicated by the reference sign U in FIG. 16).

This allows the operator of the excavator 100 just to operate the bucket 9 or the upper swing body 3 such that the indicator 73I faces an upper part of the screen while seeing the indicator 73I, thereby easily causing the bucket 9 to face the target surface 70. In addition, the relationship between the direction of the tilt of the bucket 9 (the tilt of the width direction central axis CLb of the bucket 9 with respect to the axis AXN) and the direction of the tilt of the indicator 73I is displayed as described above, whereby the direction into which the bucket 9 revolves around the central axis of the second axis AX2 so as to face the target surface 70 (the TILR direction in the case of FIG. 16), and the rotation direction of the indicator 73I (the R direction in the case of FIG. 16) accord with each other. Note that, in the case of FIG. 16, when the rotation direction of the indicator 73I is the L direction, the direction into which the bucket 9 revolves around the central axis of the second axis AX2 so as to face the target surface 70 becomes the direction indicated by TILL, and therefore, the both directions accord with each other. Therefore, the operator can intuitively grasp the operation direction when causing the bucket 9 to face the target surface 70 by confirming the movement of the indicator 73I, whereby the work efficiency and accuracy of work are improved. Note that the bucket 9 facing the target surface 70 means an edge array 91TG of the bucket 9 being parallel to the target surface 70. To be more specific, the edge array line LBT and the above-described line of intersection CPL become parallel to each other.

The processing unit 44 may move at least one of the tilt information 86c and the target surface line 78 illustrated in FIG. 9 according to the magnitude of the edge tilt angle θd (θe in FIG. 9) instead of rotating the indicator 73I of the facing compass 73 or in addition to rotating the indicator 73I. That is, the processing unit 44 may change the magnitude of the angle between the tilt information 86c corresponding to the edge array line LBT and the target surface line 78 according to the magnitude of the edge tilt angle θd. This also can provide the operator of the excavator 100 with the information for supporting the operation, especially, the information for supporting the operation when causing the bucket 9 to face the target surface 70.

In the present embodiment, the processing unit 44 make the display form of the facing compass 73 displayed on the screen 42P of the display unit 42 different before and after the edge 9T of the bucket 9 faces the target surface 70. When the edge 91 faces the target surface 70, for example, the processing unit 44 makes the color of the facing compass 73 different, from the color before facing, changes the shades of the facing compass 73, or flashes the facing compass 73. This enables the operator of the excavator 100 to reliably recognize the edge 9T of the bucket 9 and the target surface 70 face each other, whereby work efficiency is improved. Further, when the edge 9T of the bucket 9 faces the target surface 70, the form of the design of the facing compass 73 may be changed and displayed before and after facing. For example, when the edge 9T of the bucket 9 faces the target surface 70, the facing compass 73 as the posture information may be changed into letters indicating "completion of facing" and displayed, or a predetermined mark intuitively notifying the completion of facing may be displayed as the posture information. Further, as the posture information, a number corresponding to the edge tilt angle θd may be displayed on the screen 42P of the display unit 42 in place of the facing compass 73 or in addition to the facing compass 73. The operator can operate the excavator 100 to cause the bucket 9 to face the target surface 70 such that the magnitude of the displayed edge tilt angle θd is close to zero.

In the present embodiment, the processing unit 44 may employ notification with sounds when changing the form of the facing compass 73 displayed on the screen 42P of the display unit 42. In this case, the processing unit 44 notifies the sounds at predetermined intervals through the sound generation device 46 illustrated in FIG. 6 before the edge 9T of the bucket 9 faces the target surface 70, and reduces the interval of the sounds as the edge array line LBT and the above-described line of intersection CPL is getting in parallel to each other. When the edge 9T of the bucket 9 faces the target surface 70, the processing unit 44 stops the notification with sounds after continuously notifying the sounds for a predetermined time. This enables the operator of the excavator 100 to recognize that the edge 9T of the bucket 9 faces the target surface 70 not only by visual display by the facing compass 73 but also by sounds, whereby work efficiency is further improved.

The processing unit 44 favorably displays the facing compass 73 on an end portion of the screen 42P of the display unit 42 as illustrated in FIGS. 8 and 9 (in the example illustrated in FIGS. 8 and 9, on a right upper end portion when viewed by the operator of the excavator 100).

This allows the facing compass 73 to be displayed in a position not hindering the guide screen displayed on the screen 12P, whereby the operator can reliably recognize the guide screen. Further, it is favorable that the posture information display control according to the present embodiment is executed when the excavator 100 including the bucket 9 as a tilt bucket constructs a slope, and the facing compass 73 is displayed. The tilt bucket is often used for construction of a slope, and on the construction of a slope, the facing compass 73 is displayed based on the posture information display control according to the present embodiment, whereby work efficiency on the construction of a slope is improved.

In the above description, the tilt revolution surface PRT passes through the edges 9T of the plurality of blades 95 included in the bucket 9. By executing the posture information display control, using the tilt revolution surface PRT, the edge tilt angle θd can be obtained at a position where the edge 9T of the blade 95 excavates the target surface 70. As a result, the accuracy of the guidance for an operation using the facing compass 73 performed for the operator of the excavator 100 is improved. Note that the tilt revolution surface PRT may just be a plane perpendicular to the second axis AX2 that is the central axis of the tilt pin 17 and passing through at least a part of the bucket 9. While it is favorable to obtain the edge tilt angle θd within a range in which the edge 9T of the blade 9B is close to the position at which the target surface 70 is excavated, in consideration of abrasion of the edge 9T of the blade 9B, the tilt revolution surface PRT may be a plane passing through a portion other than the edge 9T of the bucket 9. Therefore, the tilt revolution surface PRT may just be such a plane.

While having been described, the present embodiment is not limited by the above-described content. Also, the above-described configuration elements include things that can be easily conceived by a person skilled in the art, which are substantially the same, and which are so-called equivalent. Further, the above-described configuration elements may be properly combined. Further, various types of omission, replacement, or alternation can be performed without departing from the gist of the present embodiment.

For example, the content of each guide screen is not limited to the above description and may be properly altered. Further, a part or the all of the functions of the display control device 39 may be executed by a computer arranged outside the excavator 100. Father, a target object to be worked is not limited to the above-described slope plane, and may have a dotted, a linear, or a three-dimensional shape. The input unit 41 of the display input device 38 is not limited to the touch panel-type input unit, and may be configured from an operation member such as a hard key and a switch. That is, the display input device 38 may be a structure in which the display unit 42 and the input unit 41 are separated.

In the above-described embodiment, the work machine 2 includes the boom 6, the arm 7, and the bucket 9 However, the work machine 2 is not limited to the above configuration and may just be one that includes at least a bucket 9 that is a tilt bucket. Further, in the above-described embodiment, the first stroke sensor 18A, the second stroke sensor 18S, and the third stroke sensor 18C detect tilt angles of the boom 6, the arm 7, and the bucket. 9. However, the detection means of the tilt angle is not limited to the above sensors. For example, an angle sensor that detects the tilt angles of the boom 6, the arm 7, and the bucket 9 may be provided.

Further, in the present embodiment, the bucket tilt angle θ4 is detected by the bucket tilt sensor 18D illustrated in FIGS. 4 and 6. However, detection of the bucket tilt angle is not limited to the embodiment. For example, the bucket tilt angle θ4 may be detected using a stroke sensor that detects the stroke length of the tilt cylinder 13 in place of the bucket tilt sensor 18D. In this case, the display control device 39, to be more specific, the processing unit 44 obtains the tilt angle of the edge 9T or the edge array 9TG of the bucket 9 with respect to the third axis AX3 as the bucket tilt angle θ4 from the stroke length of the tilt cylinders 13 and 13 detected by the stroke sensor.

REFERENCE SIGNS LIST

1 VEHICLE BODY
2 WORK MACHINE
3 UPPER SWING BODY
5 TRAVELING DEVICE
6 BOOM
7 ARM
8 COUPLING MEMBER
9 and 9a BUCKET
9B and 9Ba BLADE
9T and 9Ta EDGE
9TG and 9TGa EDGE ARRAY
10 BOOM CYLINDER
11 ARM CYLINDER
12 BUCKET CYLINDER
13 TILT CYLINDER
15 ARM PIN
16 BUCKET PIN
17 TILT PIN
18D BUCKET TILT SENSOR
19 POSITION DETECTION UNIT
25 OPERATION DEVICE
38 DISPLAY INPUT DEVICE
39 DISPLAY CONTROL DEVICE
42 DISPLAY UNIT
42P SCREEN
43 STORAGE UNIT
44 PROCESSING UNIT
70 TARGET SURFACE
73 FACING COMPASS
73I INDICATOR
100 EXCAVATOR
101 DISPLAY SYSTEM OF EXCAVATING MACHINE (DISPLAY SYSTEM)
AX1 FIRST AXIS
AX2 SECOND AXIS
AX3 THIRD AXIS
CPL LINE OF INTERSECTION
LBT EDGE ARRAY LINE
PRT TILT REVOLUTION SURFACE
θ4 BUCKET TILT ANGLE (TILT ANGLE)
θd EDGE TILT ANGLE

The invention claimed is:

1. A display system of excavating machine used in an excavating machine including a work machine including a bucket configured to revolve around a first axis and to revolve around a second axis perpendicular to the first axis, so that an edge tilts with respect to a third axis perpendicular to the first axis and to the second axis, and a body unit to which the work machine is attached, the display system of excavating machine comprising:
   a vehicle state detection unit configured to detect information related to a current position and a posture of the excavating machine;
   a bucket tilt detection unit configured to detect a tilt angle (θ4) of the bucket with respect to the third axis as the tilt angle of the bucket;
   a storage unit configured to store at least position information of a target surface indicating a target shape of an object to be worked; and
   a processing unit configured to obtain an angle between the edge and the target surface as an edge tilt angle (θd) from a position of the edge of the bucket obtained based on the tilt angle of the bucket and the information related to the current position and the posture of the excavating machine, and to display posture information indicating information related to a posture of the bucket on a screen of a display device based on the obtained edge tilt angle.

2. The display system of excavating machine according to claim 1, wherein the processing unit is configured to obtain an angle between a line of intersection in which a plane perpendicular to the second axis and passing through the edge of the bucket intersects with the target surface, and the edge as the edge tilt angle.

3. The display system of excavating machine according to claim 1, wherein the processing unit is configured to make a form of the posture information to be displayed on the screen of the display device different before and after the edge of the bucket faces the target surface.

4. The display system of excavating machine according to claim 1, wherein the processing unit is configured to display the posture information on an end portion of the screen of the display device.

5. The display system of excavating machine according to claim 1, wherein the processing unit is configured to display the posture information on the screen of the display device when the excavating machine constructs a slope.

6. An excavating machine comprising:
   a work machine including a bucket configured to revolve around a first axis and to revolve around a second axis perpendicular to the first axis, so that an edge tilts with respect to a third axis perpendicular to the first axis and to the second axis;
   a body unit to which the work machine is attached;
   a traveling device included in the body unit; and
   the display system of excavating machine according to claim 1.

7. A display computer program product of excavating machine having a non-transitory computer readable medium including programmed instructions, wherein the excavating machine is used for an excavating machine including a work machine including a bucket configured to revolve around a first axis and to revolve around a second axis perpendicular to the first axis, so that an edge tilts with respect to a third axis perpendicular to the first axis and to the second axis, and a body unit to which the work machine is attached, and the instructions, when executed by a computer, cause the computer to perform:
   obtaining a position of the edge of the bucket based on a tilt angle (θ4) of the bucket with respect to the third axis and information related to a current position and a posture of the excavating machine;
   obtaining an angle between a line of intersection in which a plane perpendicular to the second axis and passing through the edge of the bucket intersects with the target surface, and the edge, from the position of the edge as an edge tilt angle (θd); and displaying posture information indicating information related to a posture of the bucket on a screen of a display device based on the obtained edge tilt angle.

* * * * *